United States Patent
Eilts et al.

(10) Patent No.: US 11,787,078 B2
(45) Date of Patent: Oct. 17, 2023

(54) PORTABLE CROSS CUT SYSTEM

(71) Applicant: Kreg Enterprises, Inc., Huxley, IA (US)

(72) Inventors: Paul Eilts, Zearing, IA (US); Elliot Hoff, Ames, IA (US); Jens Pedersen, Des Moines, IA (US); Stacy Peterson, Ames, IA (US); Christian Ewoldt, Ankeny, IA (US); Kevin Choi, Nevada, IA (US)

(73) Assignee: Kreg Enterprises, Inc., Ankeny, IA (US)

( * ) Notice: Subject to any disclaimer, the term of this patent is extended or adjusted under 35 U.S.C. 154(b) by 245 days.

(21) Appl. No.: 17/080,254

(22) Filed: Oct. 26, 2020

(65) Prior Publication Data
US 2021/0122080 A1    Apr. 29, 2021

Related U.S. Application Data

(60) Provisional application No. 62/926,791, filed on Oct. 28, 2019.

(51) Int. Cl.
*B27B 9/04* (2006.01)
*B23Q 9/00* (2006.01)

(52) U.S. Cl.
CPC .............. *B27B 9/04* (2013.01); *B23Q 9/0042* (2013.01)

(58) Field of Classification Search
CPC .................................................... B23Q 9/0042
USPC ......................................................... 83/745
See application file for complete search history.

(56) References Cited

U.S. PATENT DOCUMENTS

| | | | | |
|---|---|---|---|---|
| 2,571,569 A * | 10/1951 | Greenwood | ......... | G01B 3/1084 33/484 |
| 4,642,898 A * | 2/1987 | Miller | ....................... | B25H 7/00 33/764 |
| 5,182,975 A * | 2/1993 | Warner | ................ | B23Q 9/0042 83/745 |
| 5,390,425 A * | 2/1995 | Gilberts | ............. | B23Q 17/2233 83/745 |
| 5,481,810 A * | 1/1996 | Hastings | ............... | B43L 7/0275 33/760 |
| 5,509,338 A * | 4/1996 | Ekker | .................... | B23Q 9/005 83/745 |
| 5,787,599 A * | 8/1998 | Clifton | ................. | G01B 3/1071 33/760 |
| 6,226,885 B1 * | 5/2001 | Korich | ................. | G01B 3/1084 33/760 |

(Continued)

*Primary Examiner* — Sean M Michalski
(74) *Attorney, Agent, or Firm* — BROWNWINICK LAW FIRM; Christopher A. Proskey

(57) ABSTRACT

A portable cross cut system is presented that includes a main body having a reference edge configured to be aligned against an edge of a workpiece and an engagement member configured to be laid on top of the workpiece. A first guide edge extends along an outward edge of the main body and the engagement member and is configured to guide an edge of a baseplate of a cutting tool during a cutting operation. The main body includes a blade offset member having an arm that moves between an extended position and a retracted position. When the arm is extended the outward end of the arm indicates the position of a cut line so that the user can easily align the position of the portable cross cut system to easily and accurately make cuts in a workpiece.

27 Claims, 22 Drawing Sheets

(56) References Cited

U.S. PATENT DOCUMENTS

| | | | | |
|---|---|---|---|---|
| 6,393,710 B1* | 5/2002 | Hastings | ............... | G01B 3/1071 33/760 |
| 6,604,296 B2* | 8/2003 | Mastrobattista | ..... | B23Q 9/0042 83/745 |
| 7,020,978 B1* | 4/2006 | Nelson | .................... | B43L 7/005 33/759 |
| 7,219,440 B2* | 5/2007 | Lewis | .................. | G01B 3/1071 33/760 |
| 7,484,313 B1* | 2/2009 | Ogilvie | .................. | B43L 7/005 33/760 |
| 8,479,630 B2* | 7/2013 | Osbourne | ............... | B26B 29/06 83/745 |
| 9,114,546 B1* | 8/2015 | Francis | .................... | B27B 9/04 |
| 9,593,925 B2* | 3/2017 | Couture | .............. | G01B 3/1084 |
| 2003/0037453 A1* | 2/2003 | Mastrobattista | ..... | B23Q 9/0042 33/484 |
| 2004/0172846 A1* | 9/2004 | McRae | ................ | G01B 3/1041 33/760 |
| 2005/0172776 A1* | 8/2005 | Beleski | ................. | B23Q 9/005 83/745 |
| 2006/0196072 A1* | 9/2006 | Lewis | ................. | G01B 3/1084 33/760 |
| 2008/0289206 A1* | 11/2008 | Mastrobattista | ..... | B23Q 9/0042 33/630 |
| 2018/0180394 A1 | 6/2018 | Ursell et al. | | |

* cited by examiner

PORTABLE CROSS CUT SYSTEM

CROSS REFERENCE TO RELATED APPLICATION

This application claims the benefit of U.S. Provisional Application No. 62/926,791, titled "PORTABLE CROSS CUT SYSTEM" and filed on Oct. 28, 2019, the entirety of which is incorporated herein fully by reference.

FIELD OF THE DISCLOSURE

This disclosure relates generally to wood working. More particularly, and without limitation, this disclosure relates to cutting sheet material workpieces with a portable cross cut system.

OVERVIEW OF THE DISCLOSURE

A number of systems and devices have been developed for cutting wood and other materials. Common types of cutting systems include: band saws, circular saws, miter saws and table saws. Each of these saw configurations have their own unique benefits as well as their own unique disadvantages and drawbacks.

Band saws are formed of a rotating saw blade that is formed in the shape of a band or continuous loop. This blade is relatively narrow and therefore band saws are tremendously well suited for cutting intricate shapes or features in both large and small pieces of material. While effective in many applications, band saws suffer from many disadvantages.

Namely, band saws are not well suited for making long straight cuts due to the narrow configuration of the blade. In addition, due to the large blade, band saws are generally large in stature which makes them stationary, and not portable, tools limited to use within the confines of a workshop. In addition, band saw blades are generally expensive. Also, band saws generally have a slow throughput. Another disadvantage of band saws is that the blade can be easily moved by grains in the wood due to the flexible nature and narrow width of the blade, which adds inaccuracy to straight cuts. For these reasons, band saws are not well suited or desirable for many cutting operations or many users.

Table saws are generally formed of a rotating blade that that sticks upward from a table top surface. Table saws are generally well suited for making straight cuts in pieces of plank material. While table saws can be used with great precision to make straight cuts, table saws suffer from many disadvantages.

Namely, due to the rotating blade sticking up from the table top surface, table saws have a generally sinister appearance and therefore many users are scared or intimidated by table saws. While some of the bad reputation table saws have is partially fiction, it is true that the exposed blade is very dangerous, especially when used by the novice user. Another disadvantage of table saws is that due to the fact that the blade protrudes from a table-top-like surface, table saws are relatively large, heavy, complicated and expensive devices. Due to their large size, table saws cannot be used in many settings or are not convenient for use in many applications such as on a jobsite as they are not very mobile or easy to set up on-site. Instead, table saws, like band saws, are generally reserved for use within the confines of a workshop. Yet another disadvantage of table saws is that they have a tendency to kick-back material during cutting.

A kick back occurs when a piece of material binds between the rotating blade and a guide surface or when a workpiece begins to twist or rotate while being cut. This often results in the blade pushing, kicking or throwing the workpiece back toward the user, sometimes in a catastrophic manner. Obviously this can be a very dangerous situation, not to mention a very scary one.

Another disadvantage of table saws is that they can be very difficult to use when cutting large sheets of material because the entire piece of material must be moved, not to mention moved in a manner that prevents binding and kick-back. If the piece of material is not precisely moved it can bind on the blade and kick back. Yet another disadvantage of table saws is that they require a lot of skill and experience to fully utilize the table saw in a safe manner. For these reasons, table saws are not well suited or desirable for many cutting operations or many users.

Circular saws are generally formed of a handheld motor connected to a rotating blade. Circular saws are relatively inexpensive, and unlike table saws, circular saws generally have a blade cover that at least tries to protect the user from the blade when not in use. This blade cover provides at least the appearance of safety which makes many users much more comfortable using a circular saw as opposed to a table saw. Also, due to their small size, circular saws are relatively easy to move and operate. In addition, circular saws are easy to transport and therefore circular saws are well suited for job-site use and are not constrained to use only within a workshop.

While circular saws have many advantages, they also have many disadvantages. Namely, due to their small size it is hard to accurately make cuts. In addition, it is difficult to make a long and straight cut with circular saws. Another disadvantage to circular saws is that the cuts are often not clean and precise, especially at the start of a cut. For these and other reasons, despite their advantages, circular saws suffer from many substantial disadvantages and limitations.

Miter saws are generally formed of a rotating saw blade that vertically pivots on a hinge and plunges toward a base and into and through a workpiece placed on the base. Miter saws are particularly well suited to make perpendicular cuts in smaller width workpieces that may be anywhere from extremely long to extremely short. Miter saws also angularly pivot so as to facilitate a wide range of angular cuts. Miter saws can be used to make highly precise and repeatable cuts. Miter saws are relatively inexpensive, and unlike table saws, miter saws generally have a blade cover that at least tries to protect the user from the blade. Miter saws are relatively portable.

While miter saws have many advantages, they also have many disadvantages. Namely, miter saws cannot be used for cutting through wide and/or thick workpieces. In addition, it is difficult to see exactly where a cut is going to be made on a workpiece prior to making the cut, which leads to inaccurate cuts as well as delay in making the cuts. That is, there is no easily perceptible indication where the cut is going to be made on the workpiece prior to actually performing the cut. For these and other reasons, despite their advantages, miter saws suffer from many substantial disadvantages and limitations.

As such, the prior art cutting systems suffer from many substantial disadvantages including being: unsafe, inaccurate, large, expensive, hard to use, they have limited accuracy, they are hard to guide, and they form low quality cuts, among many other disadvantages.

Therefore, for all the reasons stated above, and the reasons stated below, there is a need in the art for an improved portable cross cut system that provides functionalities and capabilities never before present in a system.

Thus, it is a primary object of the disclosure to provide a portable cross cut system that improves upon the state of the art.

Another object of the disclosure is to provide a portable cross cut system that is safe to use. Yet another object of the disclosure is to provide a portable cross cut system that is efficient to use.

Another object of the disclosure is to provide a portable cross cut system that is relatively inexpensive.

Yet another object of the disclosure is to provide a portable cross cut system that is capable of making straight cuts.

Another object of the disclosure is to a portable cross cut system that is accurate.

Yet, another object of the disclosure is to provide a portable cross cut system that is efficient to use.

Another object of the disclosure is to provide a portable cross cut system that provides precise alignment for a cutting tool.

Yet another object of the disclosure is to provide a portable cross cut system that can be used with workpieces with a wide range of thicknesses.

Another object of the disclosure is to provide a portable cross cut system that can be used with workpieces with a wide range of lengths.

Yet another object of the disclosure is to provide a portable cross cut system that can be used with workpieces with a wide range of widths.

Another object of the disclosure is to provide a portable cross cut system that is unique.

Yet another object of the disclosure is to provide a portable cross cut system that is easy to learn how to use.

Another object of the disclosure is to provide a portable cross cut system that is relatively small in size and shape.

Yet another object of the disclosure is to provide a portable cross cut system that provides many of the benefits of a miter saw.

Another object of the disclosure is to provide a portable cross cut system that holds workpieces in a firm and rigid manner.

Yet another object of the disclosure is to provide a portable cross cut system that is easy to set up. Another object of the disclosure is to provide a portable cross cut system that is easy to take down.

Yet another object of the disclosure is to provide a portable cross cut system that is easy to precisely adjust.

Another object of the disclosure is to provide a portable cross cut system that can be precisely matched to the blade of a cutting tool.

Yet another object of the disclosure is to provide a portable cross cut system that is formed of a minimum number of parts.

Another object of the disclosure is to provide a portable cross cut system that is simple to use.

Yet another object of the disclosure is to provide a portable cross cut system that is easier to use than prior art systems.

Another object of the disclosure is to provide a portable cross cut system that is more-accurate to use than prior art systems.

Yet another object of the disclosure is to provide a portable cross cut system that provides new capabilities to existing tools.

Another object of the disclosure is to provide a portable cross cut system that has a robust design.

Yet another object of the disclosure is to provide a portable cross cut system that is high quality.

Another object of the disclosure is to provide a portable cross cut system that is durable.

Yet another object of the disclosure is to provide a portable cross cut system that has a long useful life.

Another object of the disclosure is to provide a portable cross cut system that provides accurate and clean cuts.

Yet another object of the disclosure is to provide a portable cross cut system that saves time.

Another object of the disclosure is to provide a portable cross cut system that is fun to use.

Yet another object of the disclosure is to provide a portable cross cut system that can be used with workpieces of practically any material.

Another object of the disclosure is to provide a portable cross cut system that is easily portable and can be used on a job site.

Yet another object of the disclosure is to provide a portable cross cut system that makes it easier to measure cuts.

Another object of the disclosure is to provide a portable cross cut system that makes measuring more repeatable than prior art systems.

Yet another object of the disclosure is to provide a portable cross cut system that can be used with practically any cutting tool.

These and other objects, features, or advantages of the disclosure will become apparent from the specification, figures and claims.

SUMMARY OF THE DISCLOSURE

A portable cross cut system is presented that makes cutting a workpiece faster and easier. The portable cross cut system includes a main body having a reference edge that is configured to be aligned against an edge of a workpiece and an engagement member that is configured to be laid on top of the workpiece. A first guide edge extends along an outward edge of the main body and the engagement member and is configured to guide an edge of a baseplate of a cutting tool during a cutting operation. The main body includes a blade offset member having an arm that moves between an extended position and a retracted position. When the arm is extended the outward end of the arm indicates the position of a cut line so that the user can easily align the position of the portable cross cut system to easily and accurately make cuts in a workpiece. Another benefit of the portable cross cut system is that the arm of the blade offset member is spring loaded and automatically returns to the retracted position so as to prevent the arm from interfering with the cutting tool. The portable cross cut system includes a 90° edge and a 45° edge as well as a landing pad positioned rearward of the workpiece to help hold and guide the cutting tool.

DETAILED DESCRIPTION

Figure 1:
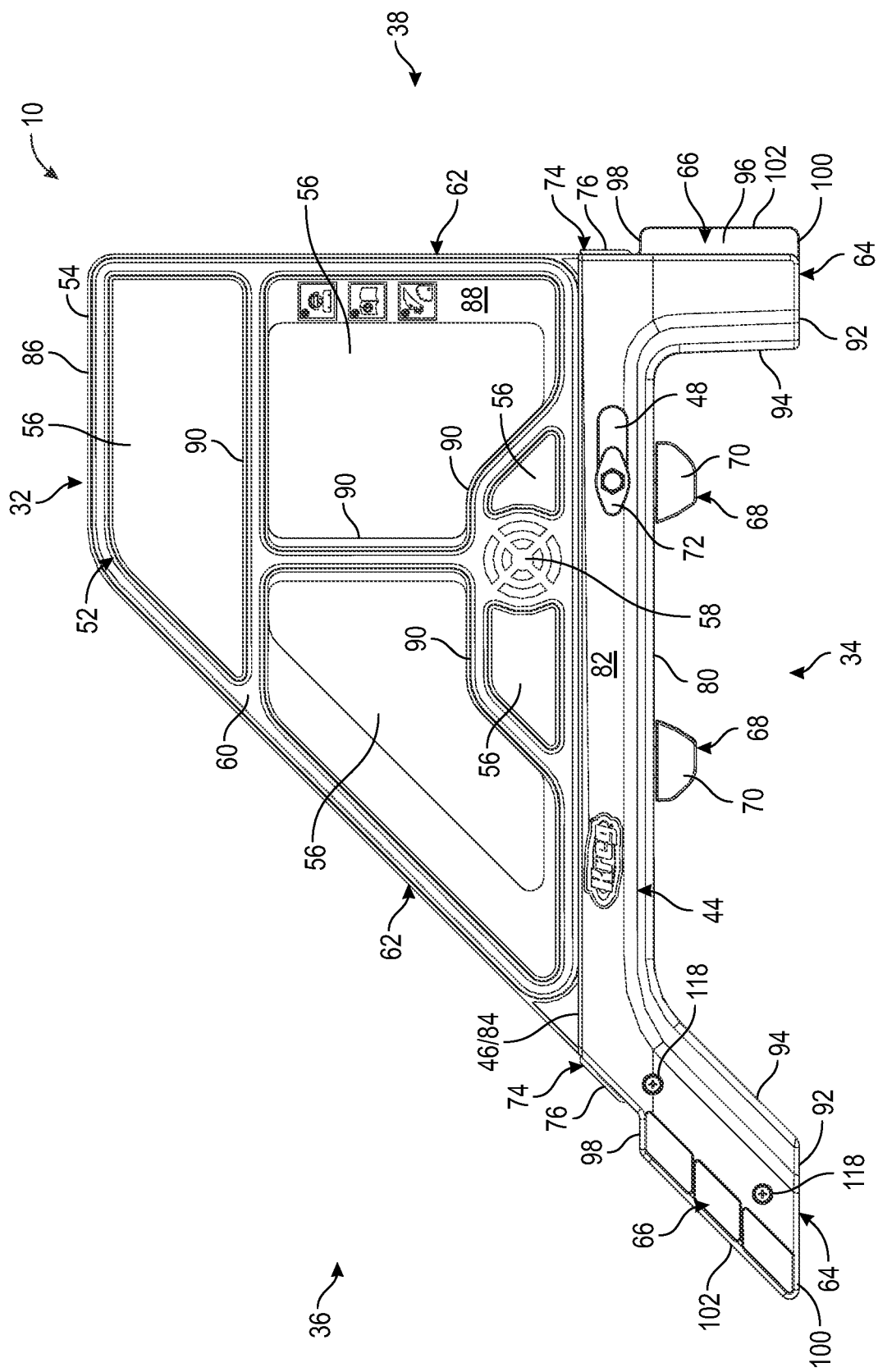
FIG. 1 shows a topside view of a portable cross cut system, in accordance with one or more embodiments; the view showing the portable cross cut system in a first orientation with an angled guide edge on the left side and a strait guide edge on the right side.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of use in association with cutting of wood. However, the embodiments are not so limited. Rather, it is contemplated that various disclosed embodiments may be used for cutting of any material including composite, stone, concrete, metal, plastic, or the like or any other material. It is appreciated that the embodiments may be adapted for use in various other reclamation applications, which may be improved by the disclosed structures, arrangements and/or methods. The system is merely shown and described as being used in the context of cutting wood for ease of description and as one of countless examples.

System 10:

In the arrangement shown, as one example, a portable cross cut system 10 (or simply "system 10") is presented. Portable cross cut system 10 is formed of any suitable size, shape and design and is configured to be quickly and easily placed on and aligned with a workpiece 12 so as to guide a cutting tool 14 to perform a cutting operation in a quick, easy, accurate and safe manner. In the arrangement shown, as one example, portable cross cut system 10 is used in association with a workpiece 12 having an upper surface 16, a lower surface 18, a front edge 20, a rear edge 22, and an end 24 that is configured to be cut using cutting tool 14 having a baseplate 26 having an edge 28 and a blade 30. In the arrangement shown, as one example, portable cross cut system 10 has a front side 32, a rear side 34, a left side 36, a right side 38, an upper side 40, and a lower side 42. In the arrangement shown, as one example, portable cross cut system 10 includes a main body 44 having a reference edge 46, a first slot 48, and a second slot 50, an engagement member 52 having a peripheral edge 54, openings 56, a clamp pad member 58, and at least one grip member 60, a guide edge 62, a tail section 64, a landing pad 66, a blade offset member 68 having an actuator 70, a lock member 72, an arm 74 having an outward end 76 and a bias member 78, among other parts, components, systems, features and pieces as is described herein.

Workpiece 12:

In the arrangement shown, as one example, portable cross cut system 10 is configured to be used in association with a workpiece 12. Workpiece 12 is formed of any suitable size, shape and design.

In the arrangement shown, as one example, workpiece 12 is formed of a generally square or rectangular piece of material having an upper surface 16, a lower surface 18, a front edge 20 (or first edge), a rear edge 22 (or second edge), and opposing ends 24, among other features. As examples, workpiece 12 is formed of a board, a piece of dimensioned lumber, a sheet of plywood, a sheet of medium-density fiberboard (MDF), a piece of trim, a sheet of press board, a sheet of concrete, a sheet of stone, a piece of metal, a sheet of composite material, a sheet of plastic material, a tile, a plate, or the like or any combination thereof, or any other piece of material.

In the arrangement shown, as one example, workpiece 12 is cut by cutting tool 14.

Cutting Tool 14:

In the arrangement shown, as one example, portable cross cut system 10 is configured to be used in association with a cutting tool 14. Cutting tool 14 is formed of any suitable size, shape and design and is configured to facilitate cutting of workpiece 12.

In the arrangement shown, as one example, cutting tool 14 is formed of what is known as a handheld circular saw. However, any other form of a cutting device is hereby contemplated for use as cutting tool 14 including jig saws, reciprocating saws, cutting wheels, or the like.

In the arrangement shown, as one example, cutting tool 14 includes a baseplate 26 that has a generally planar bottom surface that is configured to slide over the upper surface 16 of workpiece 12 during a cutting operation. In the arrangement shown, baseplate 26 includes an edge 28, which in the arrangement shown, as one example, is a straight edge, that is configured to slide along guide edge 62 of portable cross cut system 10 during a cutting operation, thereby providing guidance and alignment to cutting tool 14 during a cutting operation. In the arrangement shown, cutting tool 14 includes a blade 30 that is configured to extend through baseplate 26 during operation, thereby cutting workpiece 12. In the arrangement, as one example, blade 30 is a circular blade that rotates during operation.

In the arrangement shown, as one example, cutting tool 14 is configured to be used in operation with portable cross cut system 10.

Orientation:

In the arrangement shown, as one example, portable cross cut system 10 has a front side 32 and opposing a rear side 34, a left side 36 and opposing right side 38, an upper side 40 and opposing lower side 42. In the arrangement shown, as one example, portable cross cut system 10 is configured to be flipped along an axis that extends through front side 32 to rear side 34 center of portable cross cut system 10. When this occurs, the left side 36 and right side 38, flip sides. When this occurs, the upper side 40 and lower side 42, flip sides. However, when this occurs, the front side 32 and rear side 34 maintain their orientation.

Main Body 44:

In the arrangement shown, as one example, portable cross cut system 10 includes main body 44. Main body 44 is formed of any suitable size, shape and design and is configured to be held in the user's hand during use and operation, as well as serves to align portable cross cut system 10 with workpiece 14, as well as facilitates connection of the components of portable cross cut system 10.

In the arrangement shown, as one example, main body 44 extends a length between left side 36 and right side 38 between guide edge 62 on each of the left side 36 and right side 38. In the arrangement shown, as one example, main body 44 extends a forward to back width between rear edge 80 at the rear side 34 of main body 44 and reference edge 46 at the front side 32 of main body 44. In the arrangement shown, as one example, main body 44 extends a height between an opposing upper surface 82 and lower surface 82.

In the arrangement shown, as one example, rear edge 80 of main body 44 is a generally flat and straight surface that extends between opposing outward ends. In the arrangement shown, as one example, the outward ends of rear edge 80 connect to and terminate at the forward position of inward edges 94 of tail section 64. In the arrangement shown, as one example, the forward edge or reference edge 46 of main body 44 is a generally flat and straight surface that extends between opposing outward ends which terminates at guide edge 62. In the arrangement shown, as one example, rear edge 80 and forward edge or reference edge 46 extend in approximate parallel spaced planar alignment to one another. However, any other size, shape and configuration is hereby contemplated for use.

In the arrangement shown, as one example, upper surface and lower surface 82 of main body 44 are generally flat and straight surfaces that extends between opposing outward ends. In the arrangement shown, as one example, the outward ends of upper surface and lower surface 82 connect to and terminate at guide edge 62. In the arrangement shown, as one example, upper surface and lower surface 82 extend in approximate parallel spaced planar alignment to one another. However, any other size, shape and configuration is hereby contemplated for use.

In the arrangement shown, as one example, rear edge 80 of main body 44 and forward edge or reference edge 46 of main body 44 extend in approximate perpendicular alignment with upper surface 82 and lower surface 82 of main body 44. In this way, in the arrangement shown, as one example, main body 44 forms a generally square or rectangular cross-sectional shape. However, any other size, shape and configuration is hereby contemplated for use.

In the arrangement shown, as one example, the opposing sides of main body 44 serve as and/or double as and/or are in planar alignment with guide edge 62 on each side 36/38 of main body 44. In the arrangement shown, as one example, one side or guide edge 62 of main body 44 extends at an approximate perpendicular planar alignment to reference edge 46. This is shown as the right side 38 of FIG. 1. In this arrangement, as one example, the opposing or other side or guide edge 62 extends at an approximate angular planar alignment to reference edge 46. This is shown as the left side 36 of FIG. 1. In the arrangement shown, as one example, this is a 45° angle to reference edge 46.

In the arrangement shown, as one example, main body 44 houses and holds at least one blade offset member 68, as is further described herein. In the arrangement shown, as one example, main body 44 houses and holds a pair of blade offset members 68, with one blade offset member 68 associated with each side 36/38 of main body 44. In the arrangement shown, as one example, for each blade offset member 68, main body 44 includes a first slot 48 which is positioned in upper surface and lower surface 82 of main body 44, and a second slot 50 which is positioned in rear edge 80.

In the arrangement shown, as one example, first slot 48 extends a length between opposing ends and is aligned with the side-to-side length of main body 44. In the arrangement shown, as one example, first slot 48 is configured to receive lock member 72 of blade offset member 68, which extends there through. In the arrangement shown, as one example, a single first slot 48 is positioned in each of the opposing upper surface and lower surface 82 of main body 44.

In the arrangement shown, as one example, second slot 50 extends a length between opposing ends and is aligned with the side-to-side length of main body 44. In the arrangement shown, as one example, second slot 50 is configured to receive actuator 70 of blade offset member 68, which extends there through.

In the arrangement shown, as one example, engagement member 52 connects to and extends from main body 44.

Engagement Member 52:

In the arrangement shown, as one example, portable cross cut system 10 includes engagement member 52. Engagement member 52 is formed of any suitable size, shape and design and is configured to engage the upper surface 16 of workpiece 12 as well as align portable cross cut system 10 with workpiece 12. In the arrangement shown, as one example, engagement member 52 is a generally elongated member that extends upward from main body 44 that establishes an extended surface area for engagement of workpiece 12 and establishes an elongated section of guide edge 62.

In the arrangement shown, as one example, engagement member 52 extends a length between left side 36 and right side 38 between guide edge 62 on each of the left side 36 and right side 38. In the arrangement shown, as one example, engagement member 52 extends a forward to back width between a rear edge 84, that connects to the forward edge or reference edge 46 of main body 44, and forward edge 86 at the front side 32 of engagement member 52. In the arrangement shown, as one example, engagement member 52 extends a height between an opposing upper surface and lower surface 88.

In the arrangement shown, as one example, rear edge 84 of engagement member 52 is a generally flat and straight edge that extends between opposing outward ends. In the arrangement shown, as one example, the outward ends of rear edge 84 connect to and terminates at guide edge 62. In the arrangement shown, as one example, the forward edge 86 of engagement member 52 is a generally flat and straight surface that extends between opposing outward ends which terminates at corners that connect to guide edge 62. In the arrangement shown, as one example, rear edge 84 and forward edge 86 extend in approximate parallel spaced planar alignment to one another. However, any other size, shape and configuration is hereby contemplated for use.

In the arrangement shown, as one example, upper surface and lower surface 88 of engagement member 52 are generally flat and straight surfaces, or planar surfaces, that extends between opposing outward ends. In the arrangement shown, as one example, the outward ends of upper surface and lower surface 88 connect to and terminate at guide edge 62. In the arrangement shown, as one example, upper surface and lower surface 88 extend in approximate parallel spaced planar alignment to one another. However, any other size, shape and configuration is hereby contemplated for use.

In the arrangement shown, as one example, rear edge 84 of engagement member 52 and forward edge 86 of engagement member 52 extend in approximate perpendicular alignment with upper surface and lower surface 88 of engagement member 52.

In the arrangement shown, as one example, the opposing sides of engagement member 52 serve as and/or double as and/or are in planar alignment with guide edge 62 on each side 36/38 of engagement member 52. In the arrangement shown, as one example, one side or guide edge 62 of engagement member 52 extends at an approximate perpendicular planar alignment to reference edge 46. This is shown as the right side 38 of FIG. 1. In this arrangement, as one example, the opposing or other side or guide edge 62 extends at an approximate angular planar alignment to reference edge 46. This is shown as the left side 36 of FIG. 1. In the arrangement shown, as one example, this is a 45° angle to reference edge 46.

In the arrangement shown, as one example, engagement member 52 includes or forms peripheral edge 54. In the arrangement shown, as one example, with reference to FIG. 1, peripheral edge 54 of engagement member 52 forms the portion of guide edge 62 forward of reference edge 46 on each side 36/38 as well as forward edge 86.

In the arrangement shown, as one example, engagement member 52 includes a plurality of openings 56 therein. Openings 56 are formed of any suitable size, shape and design and are configured to provide access to workpiece 12, through engagement member 52, when engagement member 52 is placed on top of workpiece 12. Openings 56 allow a user to visually see workpiece 12 through engagement member 52. Openings 56 allow a user to grasp workpiece 12 through engagement member 52 during a cutting operation which allows the user to secure workpiece 12. While the arrangement shown includes five openings 56, embodiments are not so limited. Rather, it is contemplated that in various embodiments engagement member 52 may be configured with any number of openings 56 or zero openings 56.

In the arrangement shown, as one example, engagement member 52 includes clamp pad member 58. Clamp pad member 58 is formed of any suitable size, shape and design and is configured to facilitate the clamping of engagement member 52 to workpiece 12. That is, clamp pad member 58 is sized and shaped to receive the pad of a clamp on its upper surface so as to facilitate clamping of the engagement member 52 to workpiece 12. When the clamp is tightened, the lower surface of clamp pad member 58 is pressed into the upper surface 16 of workpiece 12.

In the arrangement shown, as one example, a single clamp pad member 58 is generally centrally positioned within engagement member 52 just forward of main body 44 and reference edge 46. However, any number of clamp pad members 58 are hereby contemplated for use in engagement member 52 such as none, one, two, three, four, five or more. In the arrangement shown, as one example, clamp pad member 58 is a generally circular shaped solid member of engagement member 52, however any other shape is hereby contemplated for use.

In the arrangement shown, as one example, engagement member 52 includes a plurality of structural members 90. Structural members 90 are formed of any suitable size, shape and design and are configured to extend across the mostly open interior of engagement member 52 and provide strength, rigidity and durability to engagement member 52. In the arrangement shown, as one example, structural members 90 are relatively thin and narrow extensions of material the extend across the open interior of engagement member 52.

In the arrangement shown, as one example, a structural member 90 connects to the front side 32 of clamp pad member 58 and extends outward from each side 36/38 of clamp pad member 58 a distance before connecting adjacent the rear side 34 of engagement member 52. In the arrangement shown, a structural member 90 connects to the front side 32 of clamp pad member 58 and extends forward a distance before connecting to a laterally extending structural member 90. These structural members 90 connect the sides of engagement member 52 and provide structural strength and rigidity and help to maintain the dimensions and shape of portable cross cut system 10 while providing a plurality of openings 56 in engagement member 52. Any other size, shape, design and configuration is hereby contemplated for use as structural members 90.

Figure 3:
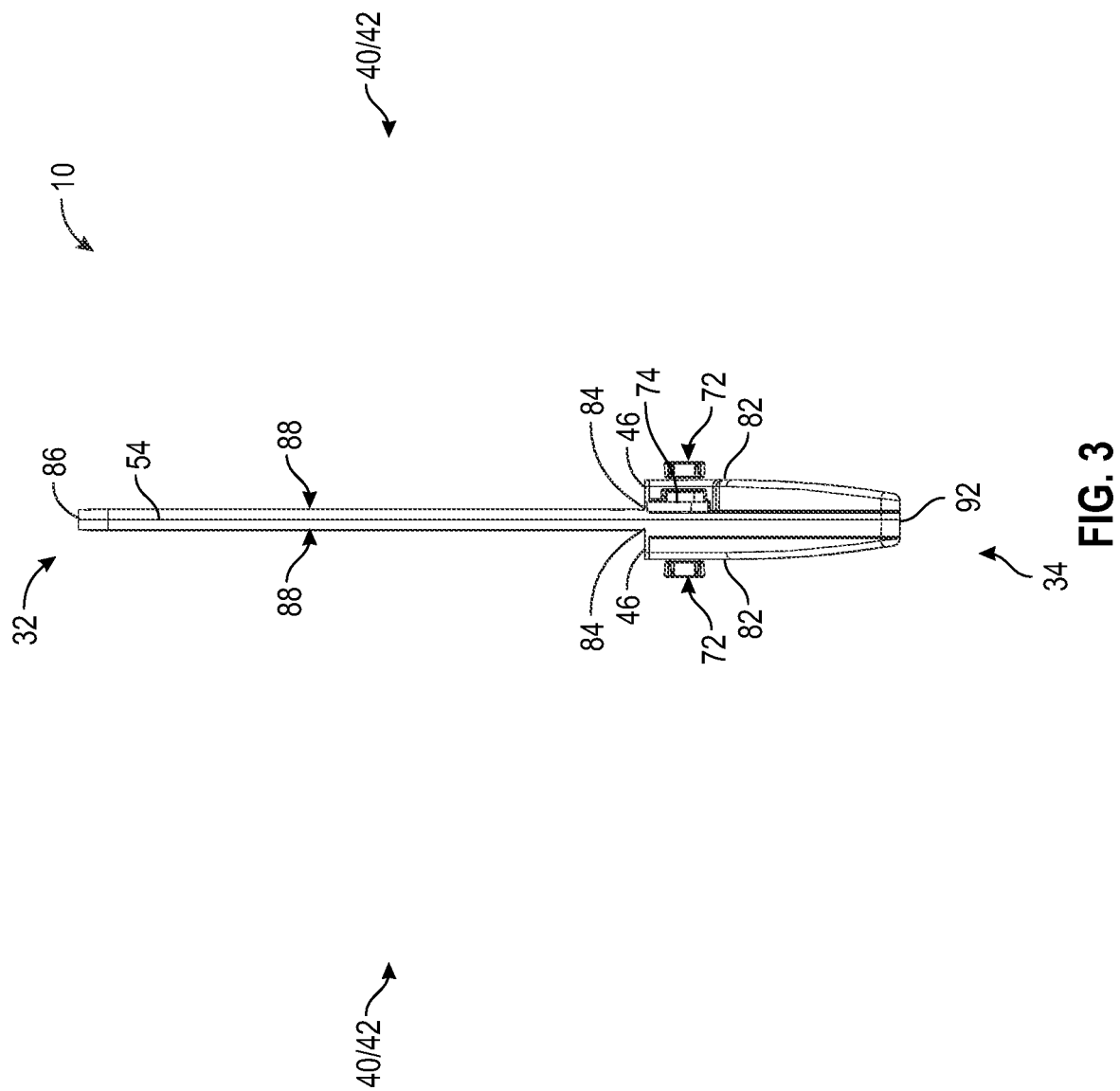
FIG. 3 shows a first side view of a portable cross cut system, in accordance with one or more embodiments.
Figure 4:
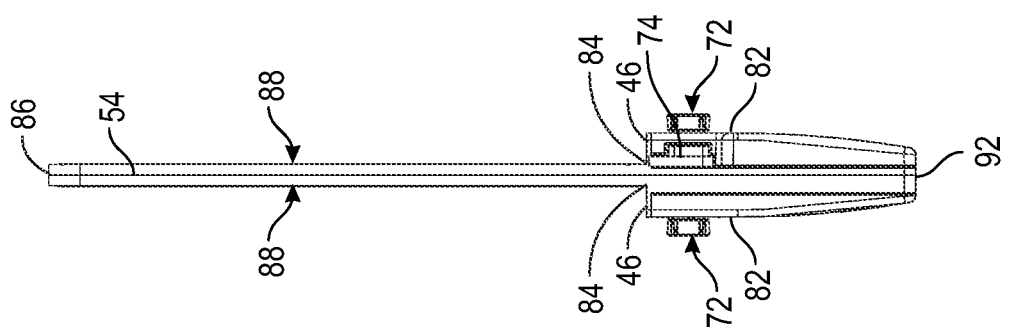
FIG. 4 shows a second side view of a portable cross cut system, in accordance with one or more embodiments.
Figure 5:
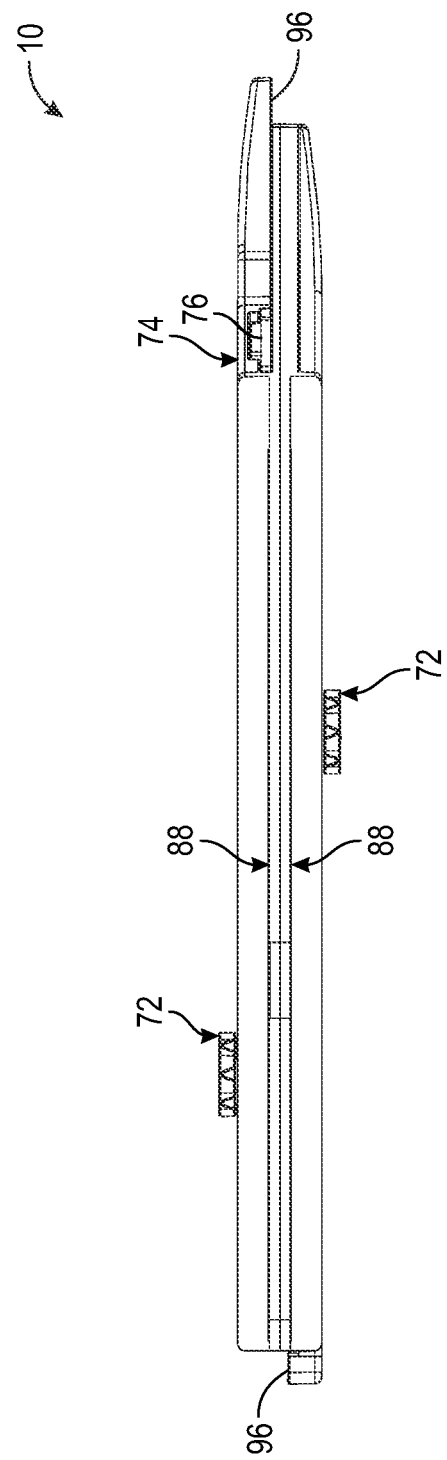
FIG. 5 shows a front view of a portable cross cut system, in accordance with one or more embodiments; the view showing the portable cross cut system in the first orientation with the angled guide edge on the left side of the system and a strait guide edge on the right side of the system.
Figure 6:
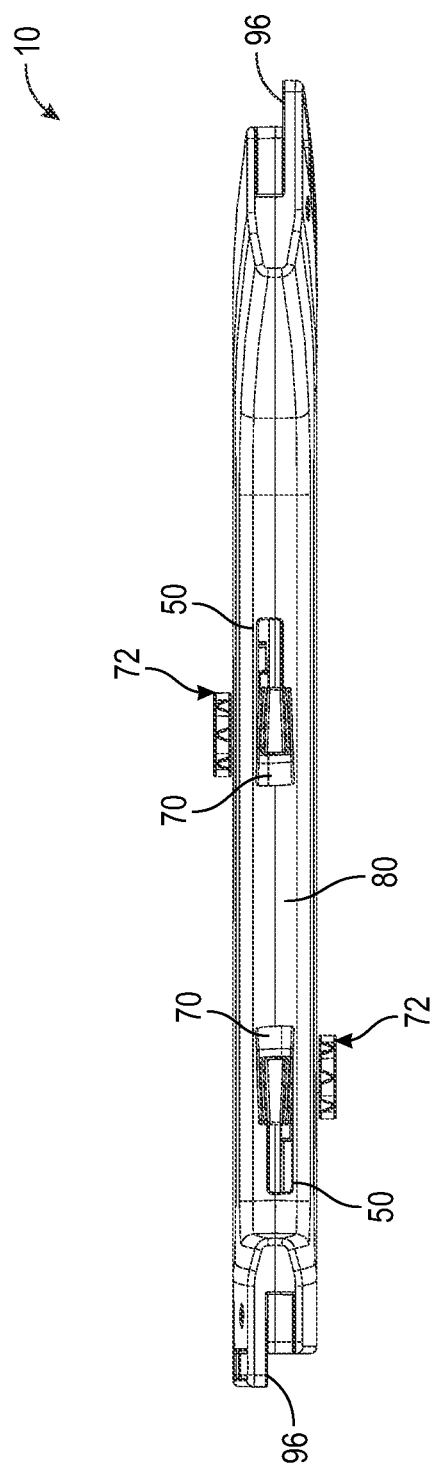
FIG. 6 shows a rear view of a portable cross cut system, in accordance with one or more embodiments; the view showing the portable cross cut system in the second orientation with an angled guide edge on the right side of the system and a strait guide edge on the left side of the system.
Figure 7:
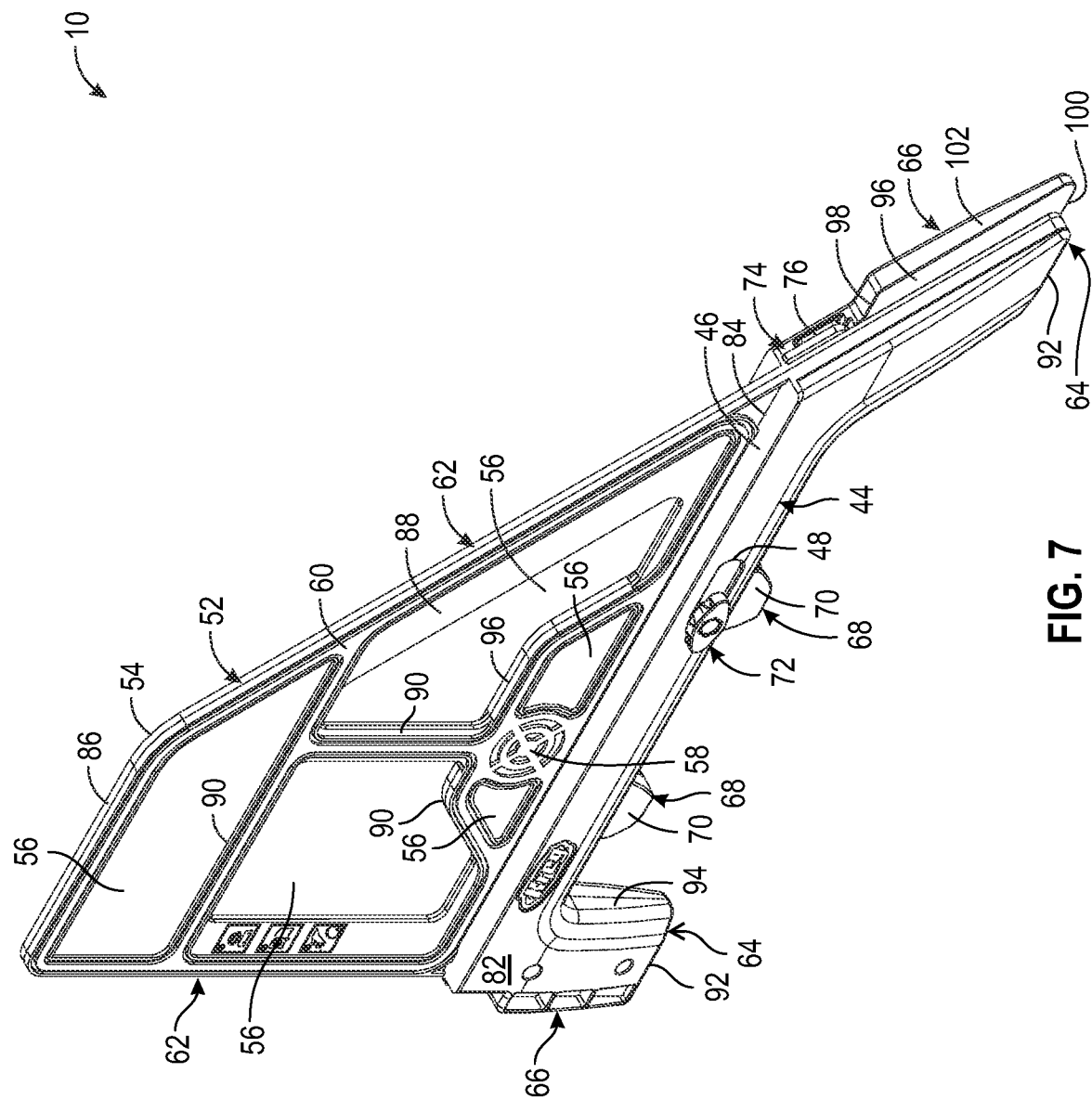
FIG. 7 shows a top front right side perspective view of a portable cross cut system, in accordance with one or more embodiments; the view showing the portable cross cut system in the second orientation with an angled guide edge on the right side of the system and a strait guide edge on the left side of the system.
Figure 8:
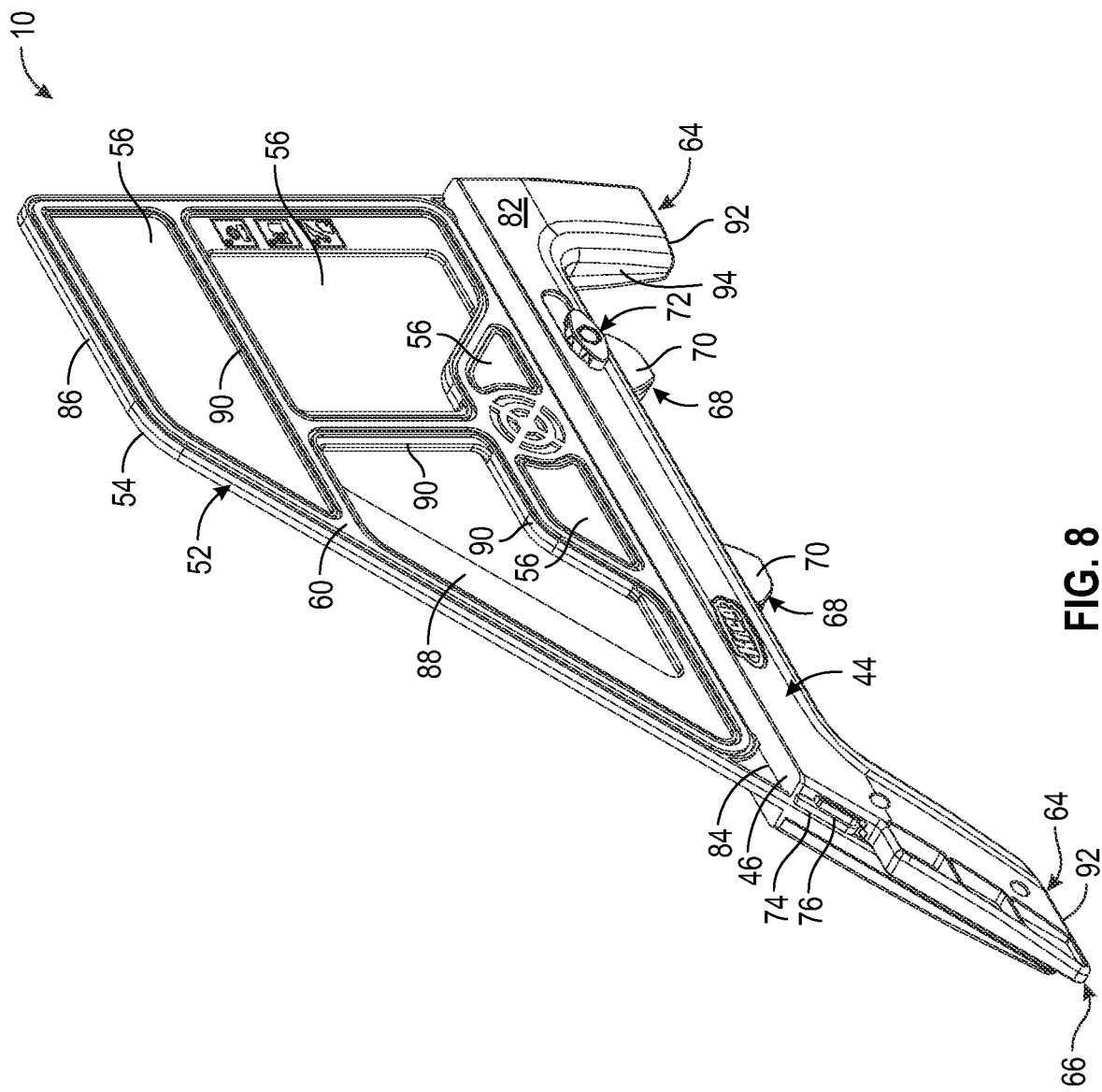
FIG. 8 shows a top front left side perspective view of a portable cross cut system, in accordance with one or more embodiments; the view showing the portable cross cut system in the first orientation with an angled guide edge on the left side of the system and a strait guide edge on the right side of the system.
Figure 9:
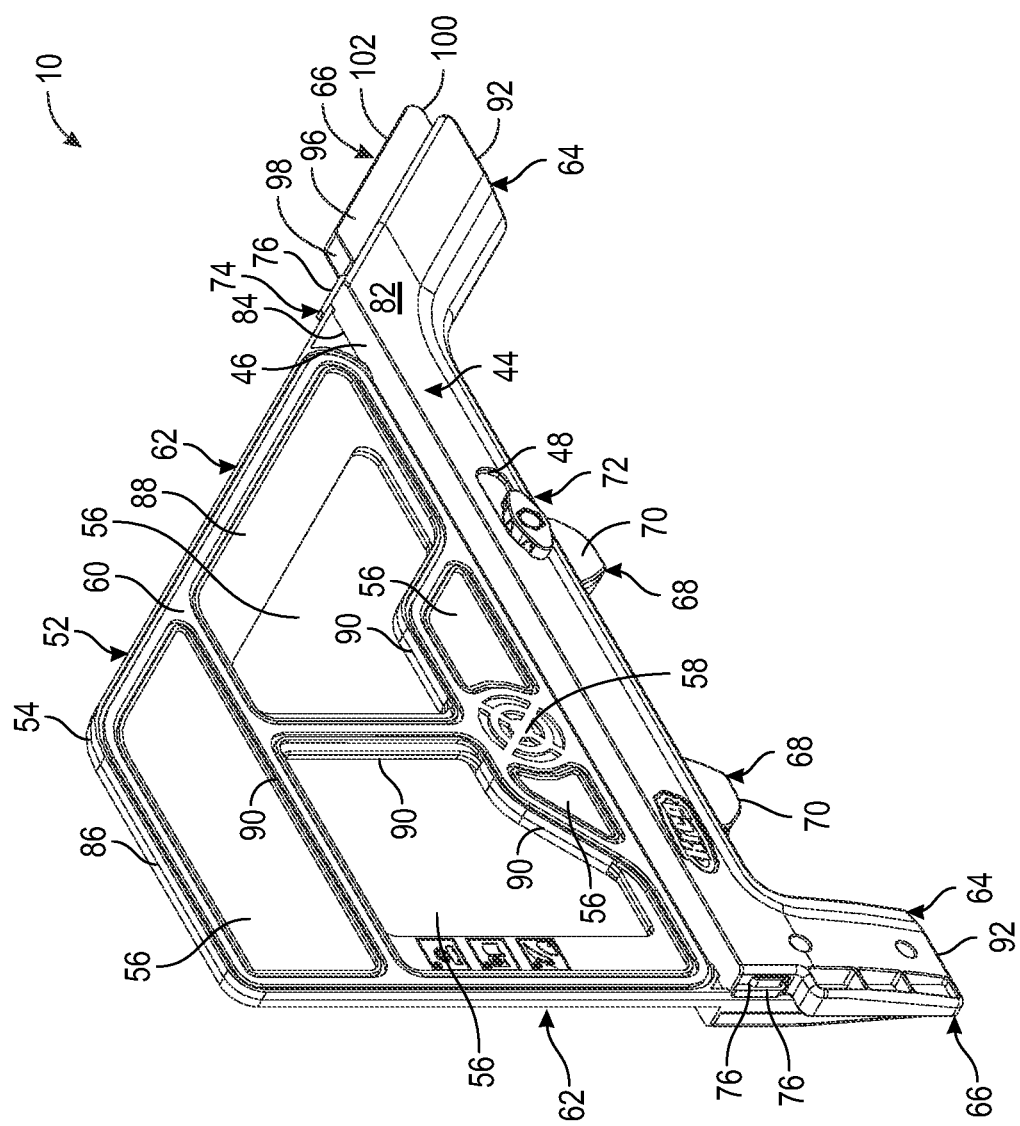
FIG. 9 shows a top front left side perspective view of a portable cross cut system, in accordance with one or more embodiments; the view showing the portable cross cut system in the second orientation with an angled guide edge on the right side of the system and a strait guide edge on the left side of the system.
Figure 10:
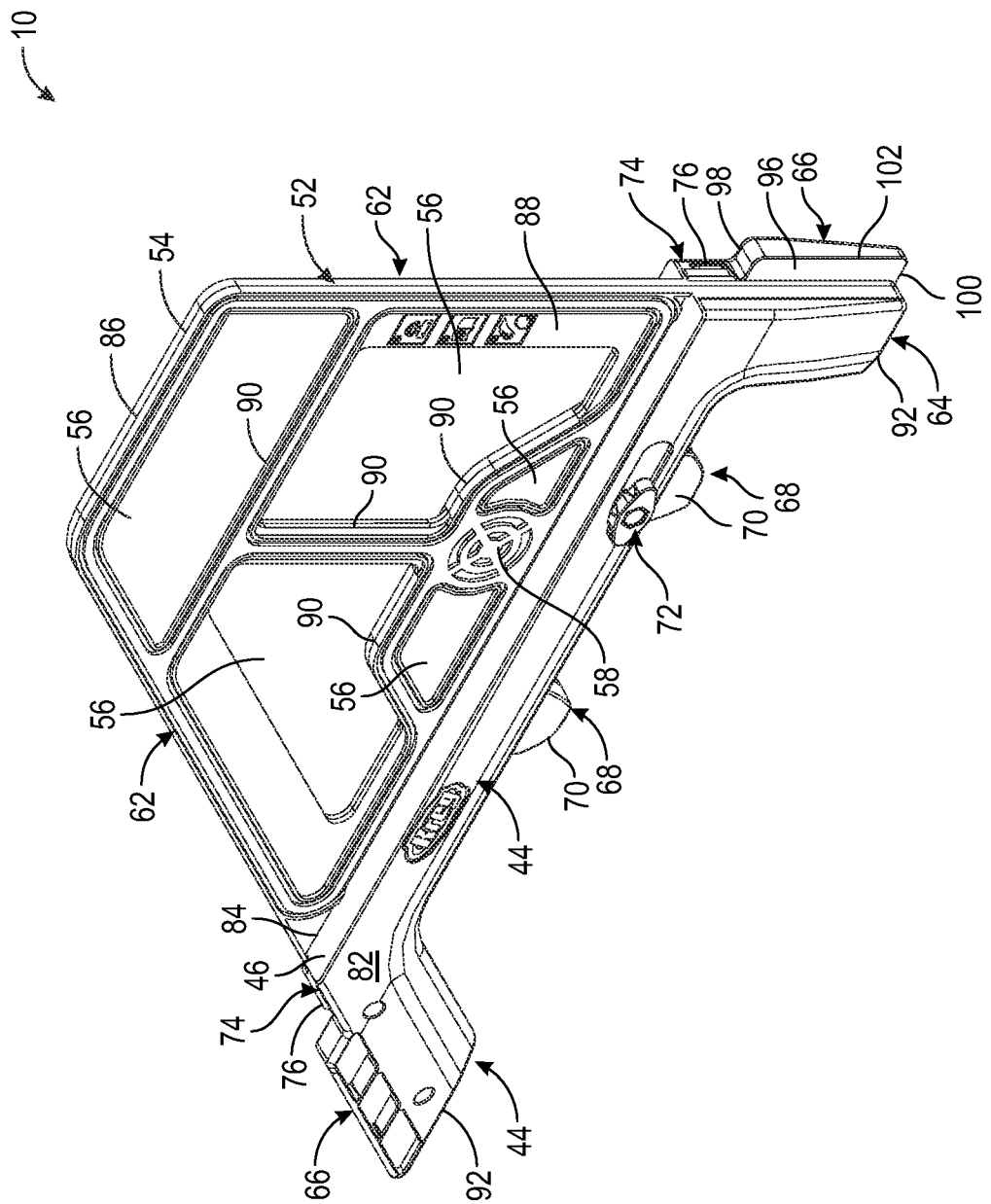
FIG. 10 shows a top front right side perspective view of a portable cross cut system, in accordance with one or more embodiments; the view showing the portable cross cut system in the first orientation with an angled guide edge on the left side of the system and a strait guide edge on the right side of the system.
Figure 11:
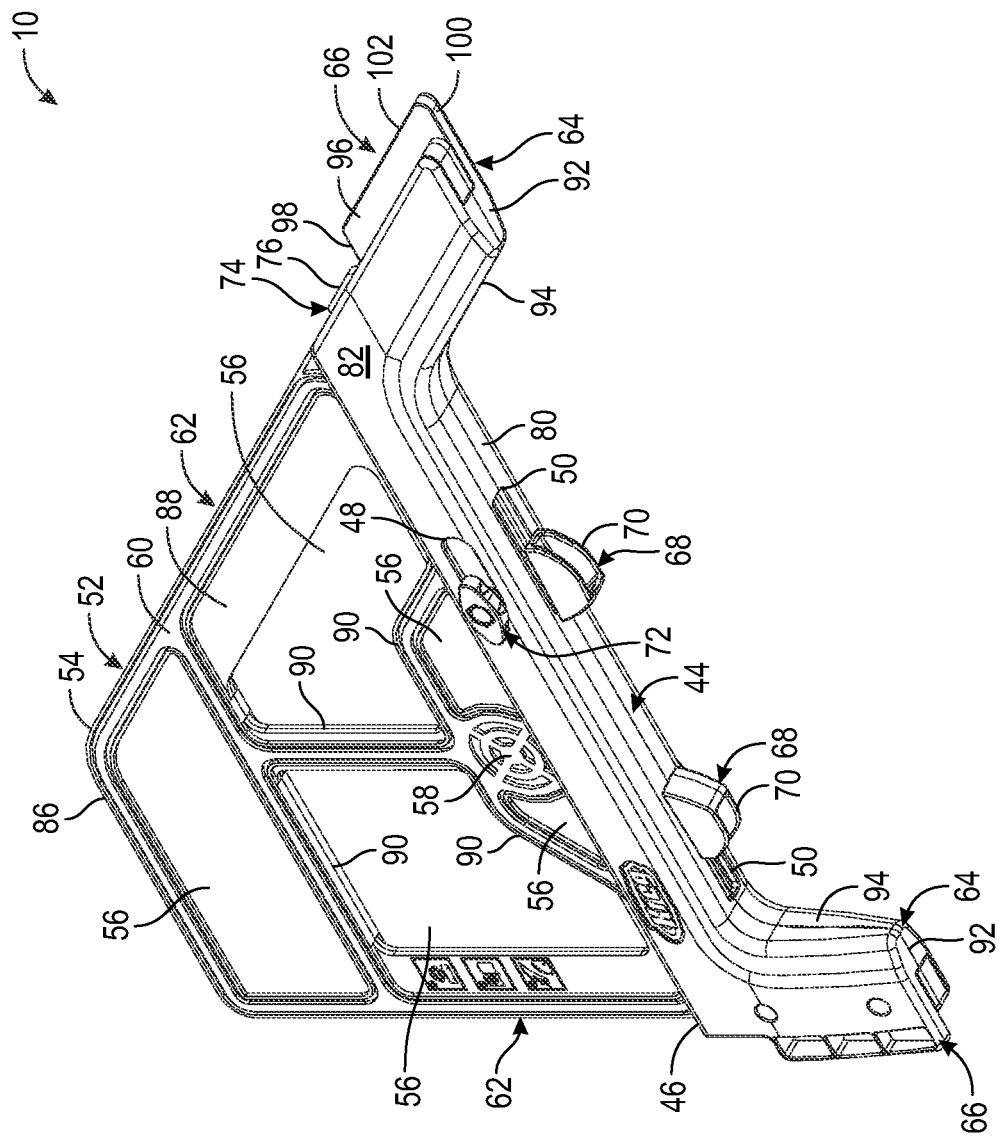
FIG. 11 shows a top rear right side perspective view of a portable cross cut system, in accordance with one or more embodiments; the view showing the portable cross cut system in the second orientation with an angled guide edge on the right side of the system and a strait guide edge on the left side of the system.
Figure 12:
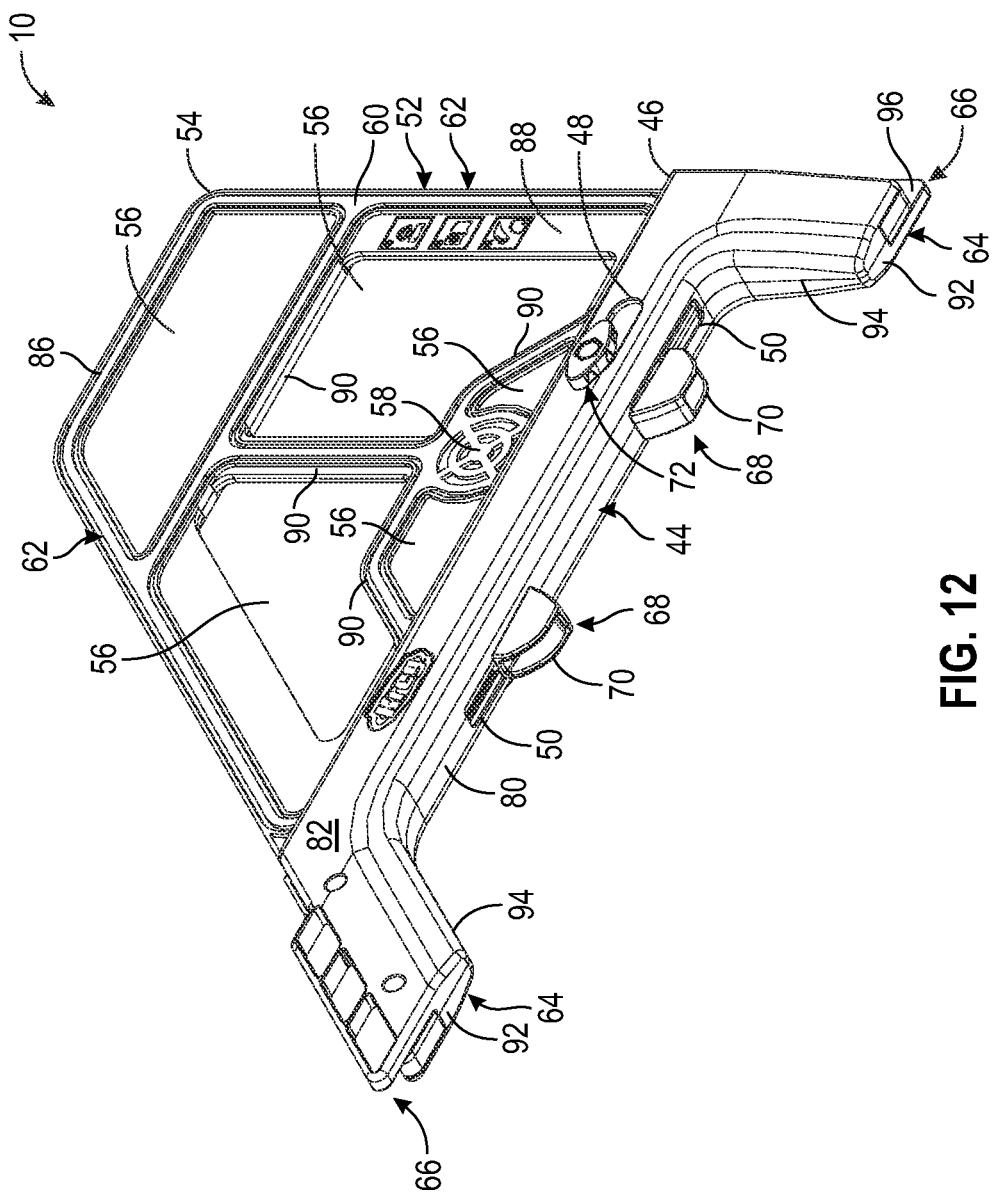
FIG. 12 shows a top rear right side perspective view of a portable cross cut system, in accordance with one or more embodiments; the view showing the portable cross cut system in the first orientation with an angled guide edge on the left side of the system and a strait guide edge on the right side of the system.
Figure 13:
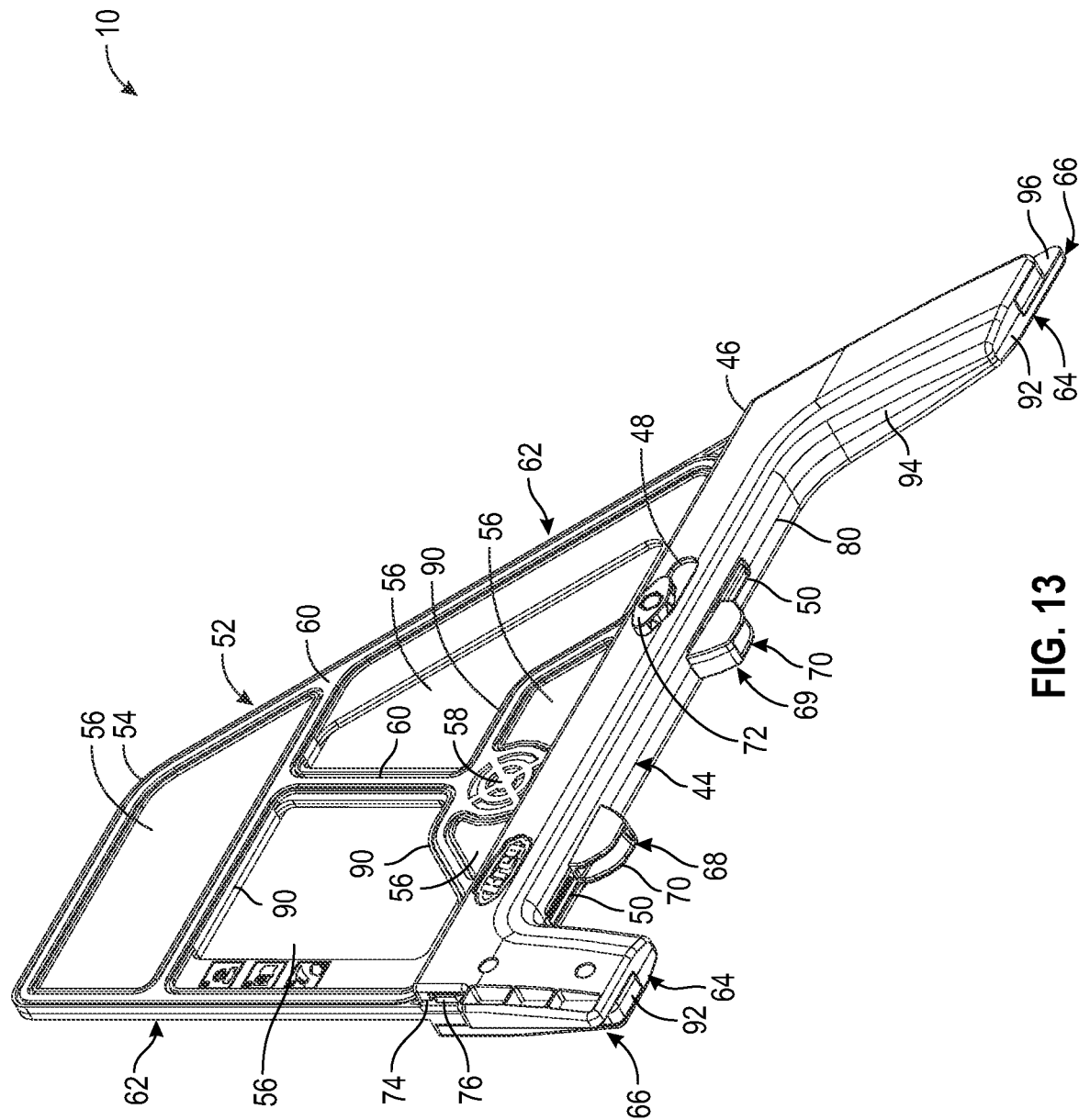
FIG. 13 shows a top rear left side perspective view of a portable cross cut system, in accordance with one or more embodiments; the view showing the portable cross cut system in the second orientation with an angled guide edge on the right side of the system and a strait guide edge on the left side of the system.
Figure 14:
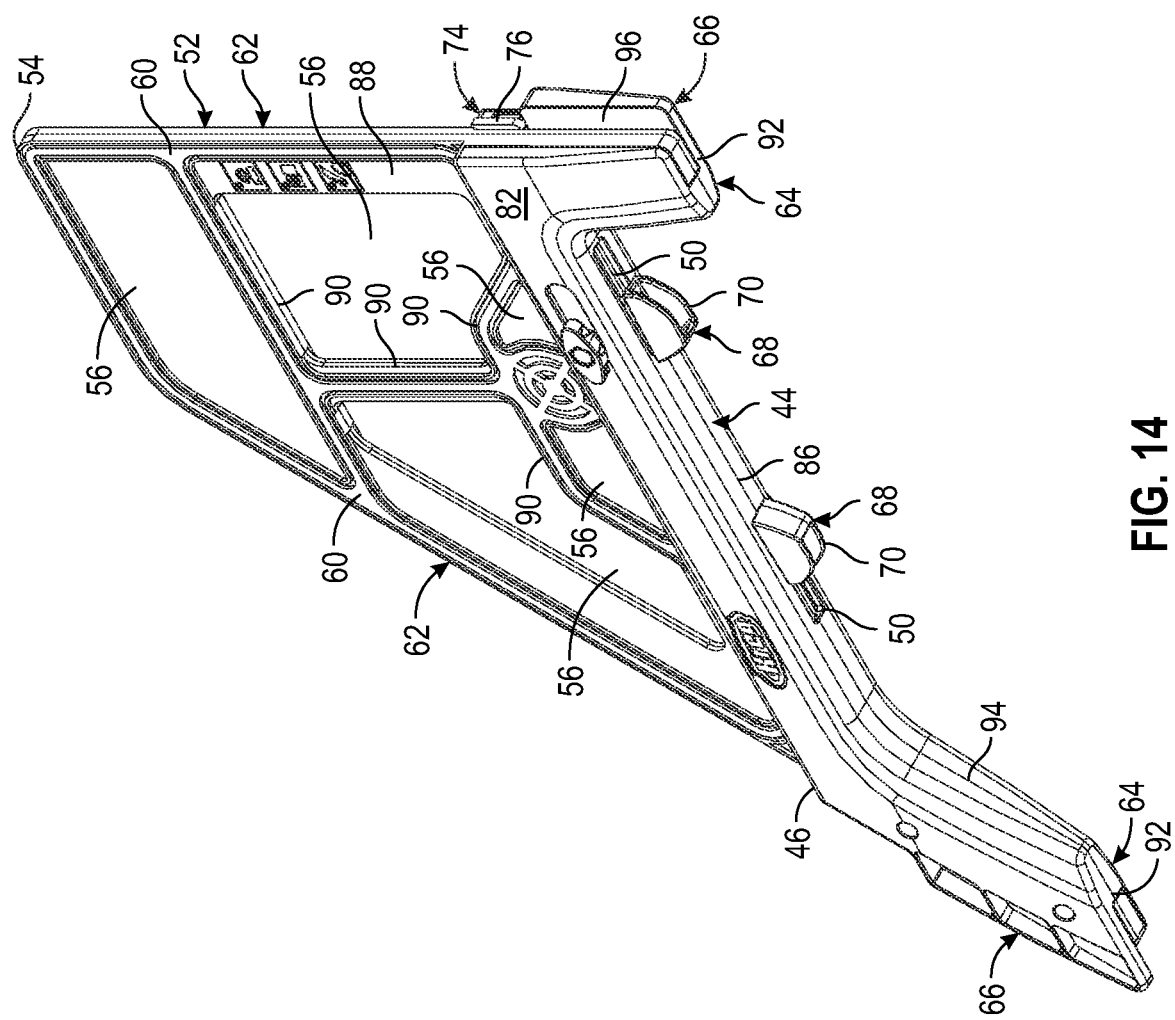
FIG. 14 shows a top rear right side perspective view of a portable cross cut system, in accordance with one or more embodiments; the view showing the portable cross cut system in the first orientation with an angled guide edge on the left side of the system and a strait guide edge on the right side of the system.
Figure 15:
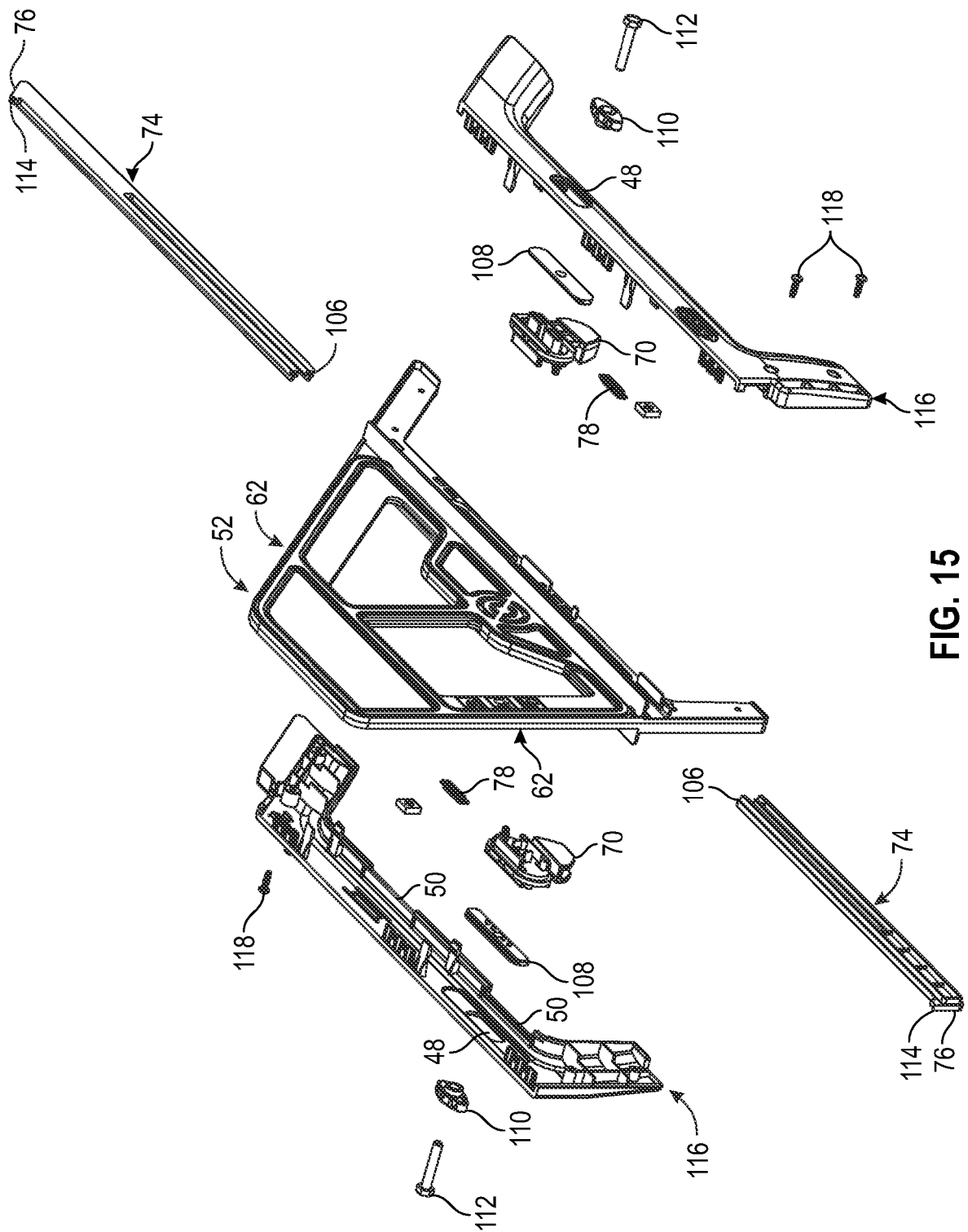
FIG. 15 shows a top front left side exploded perspective view of a portable cross cut system, in accordance with one or more embodiments; the view showing the portable cross cut system in the second orientation with an angled guide edge on the right side of the system and a strait guide edge on the left side of the system.
Figure 16:
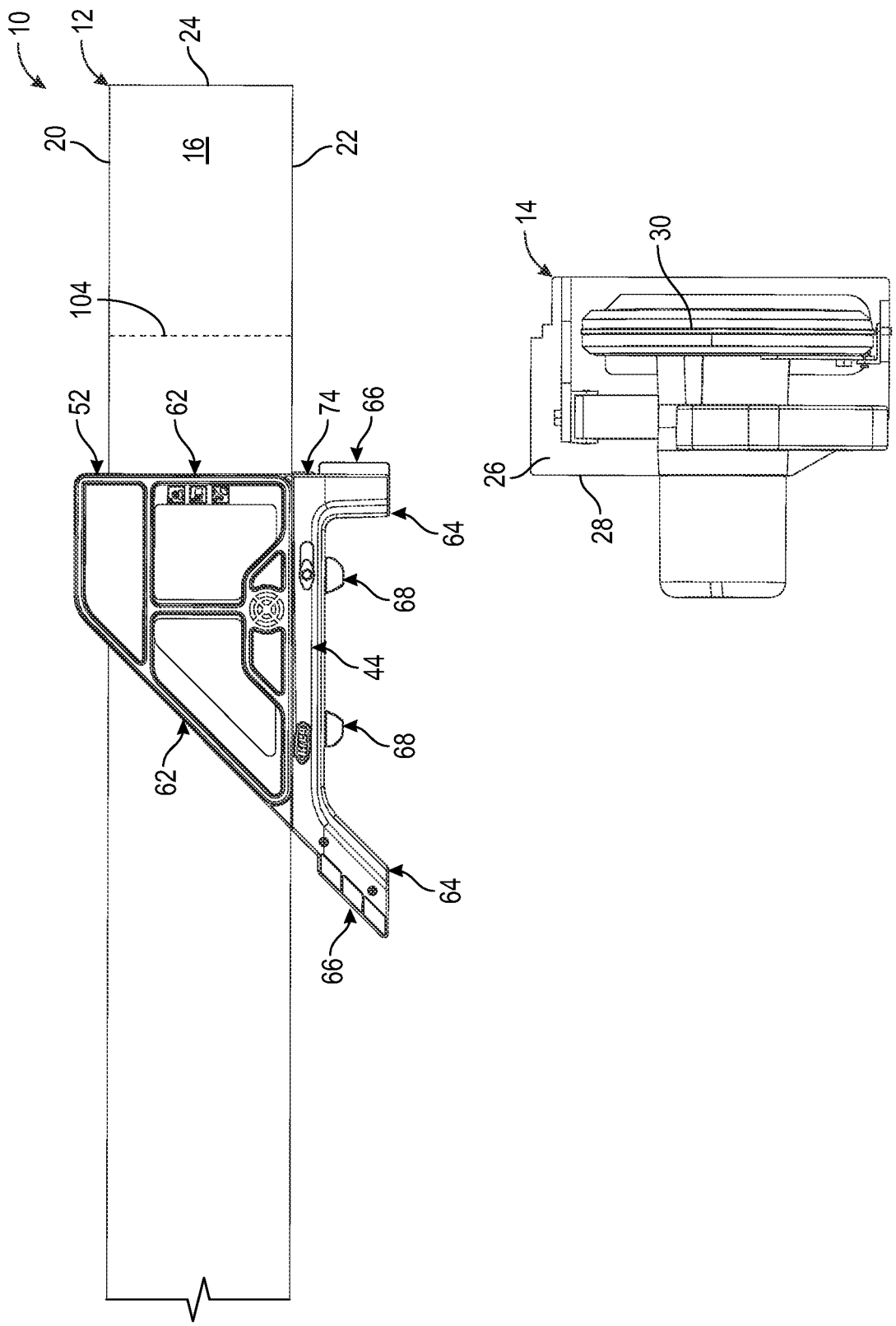
FIG. 16 shows a top view of a portable cross cut system positioned on a workpiece for cutting with a table saw, in accordance with one or more embodiments; the view showing the portable cross cut system in the first orientation with an angled guide edge on the left side of the system and a strait guide edge on the right side of the system; the view showing the portable cross cut system positioned for a strait cut of the workpiece along a measured mark; the view showing an arm of the system retracted.
Figure 17:
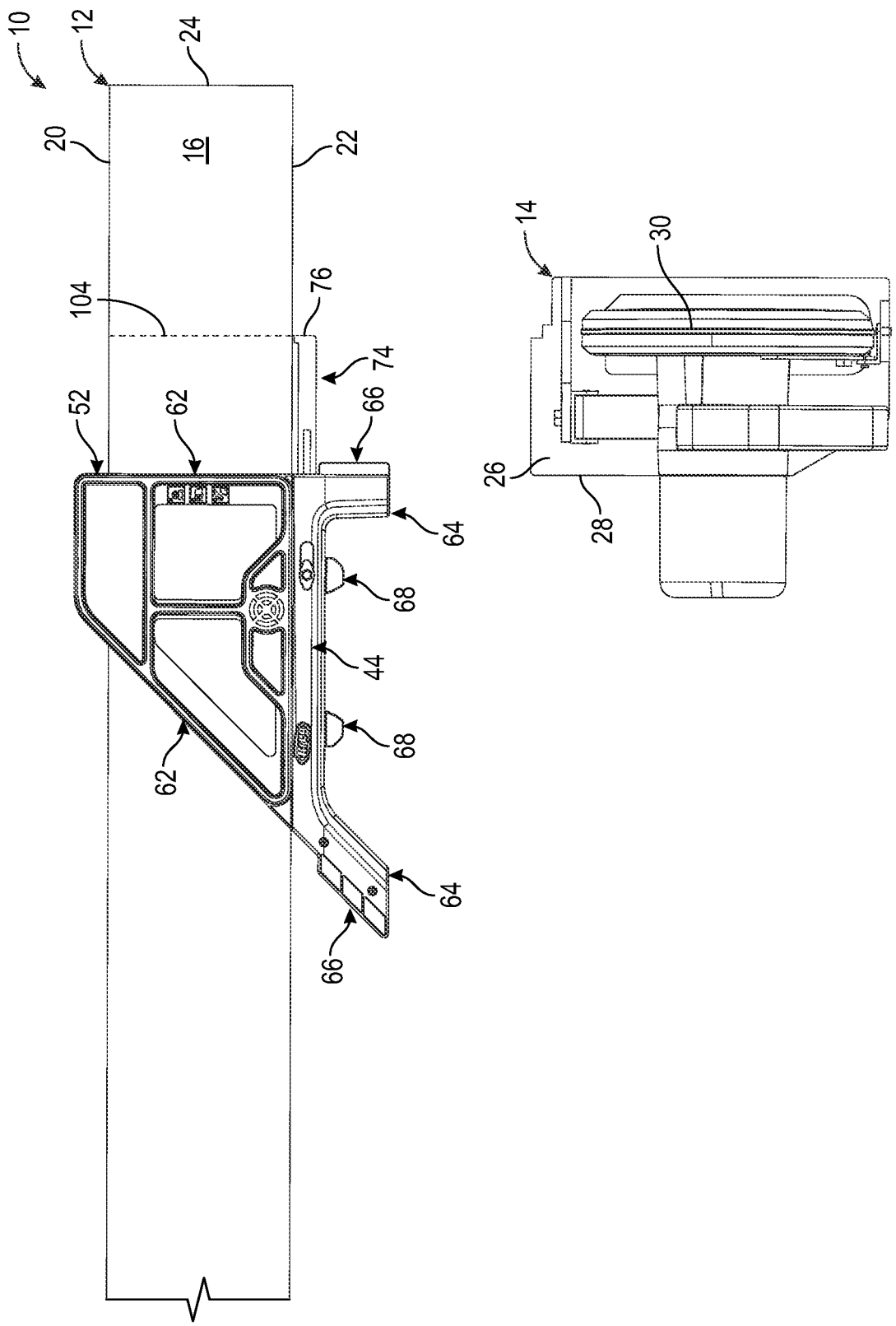
FIG. 17 shows a top view of a portable cross cut system positioned on a workpiece for cutting with a table saw, in accordance with one or more embodiments; the view showing the portable cross cut system in the first orientation with an angled guide edge on the left side of the system and a strait guide edge on the right side of the system; the view showing the portable cross cut system positioned for a strait cut of the workpiece along a measured mark; the view showing an arm of the system extended and aligned with the measuring mark.
Figure 18:
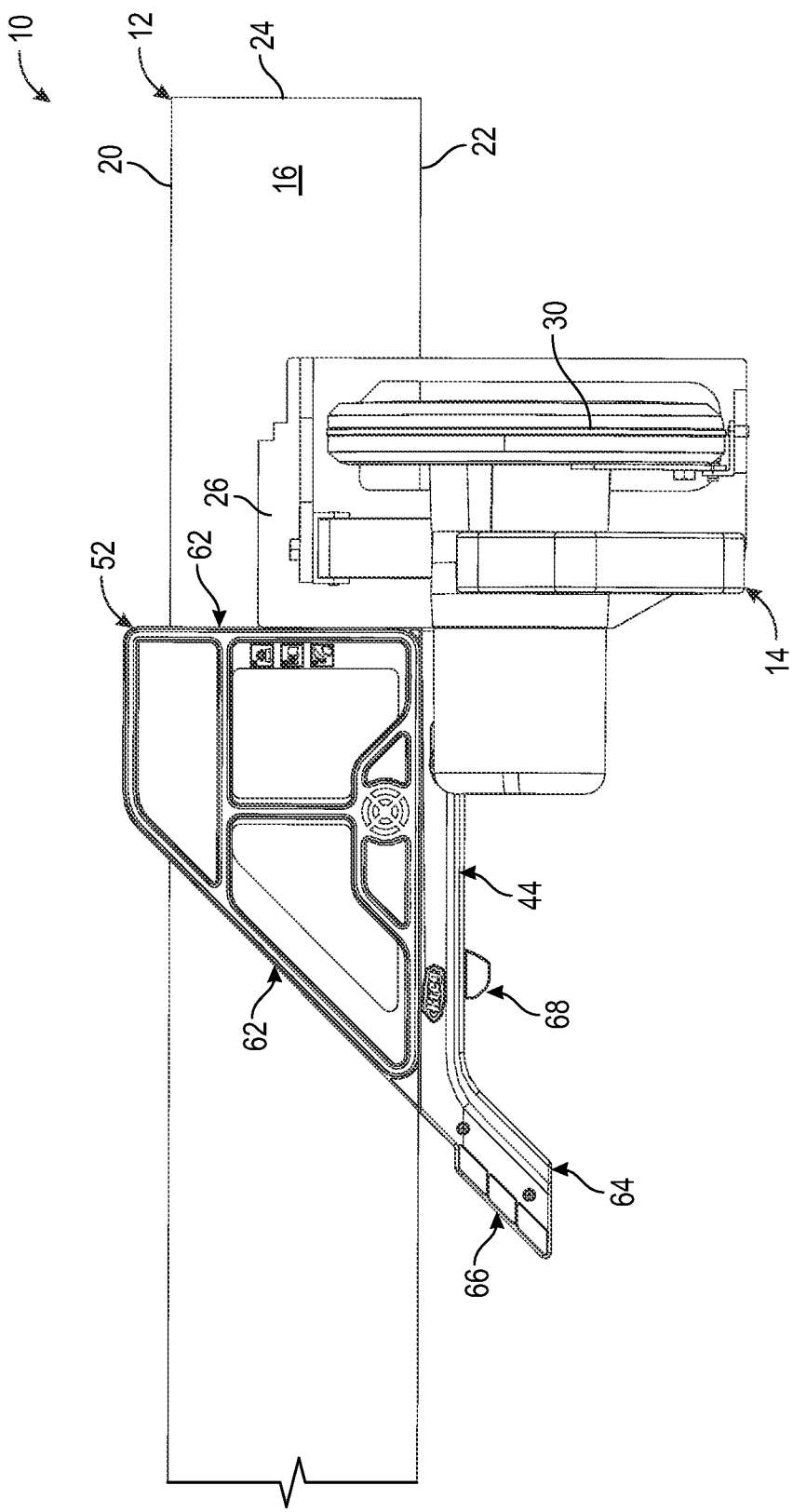
FIG. 18 shows a top view of a portable cross cut system positioned on a workpiece for cutting with a table saw, in accordance with one or more embodiments; the view showing the portable cross cut system positioned for a strait cut of the workpiece along a measured mark; the view showing the a baseplate of the saw guided along a strait edge guide of the system.
Figure 19:
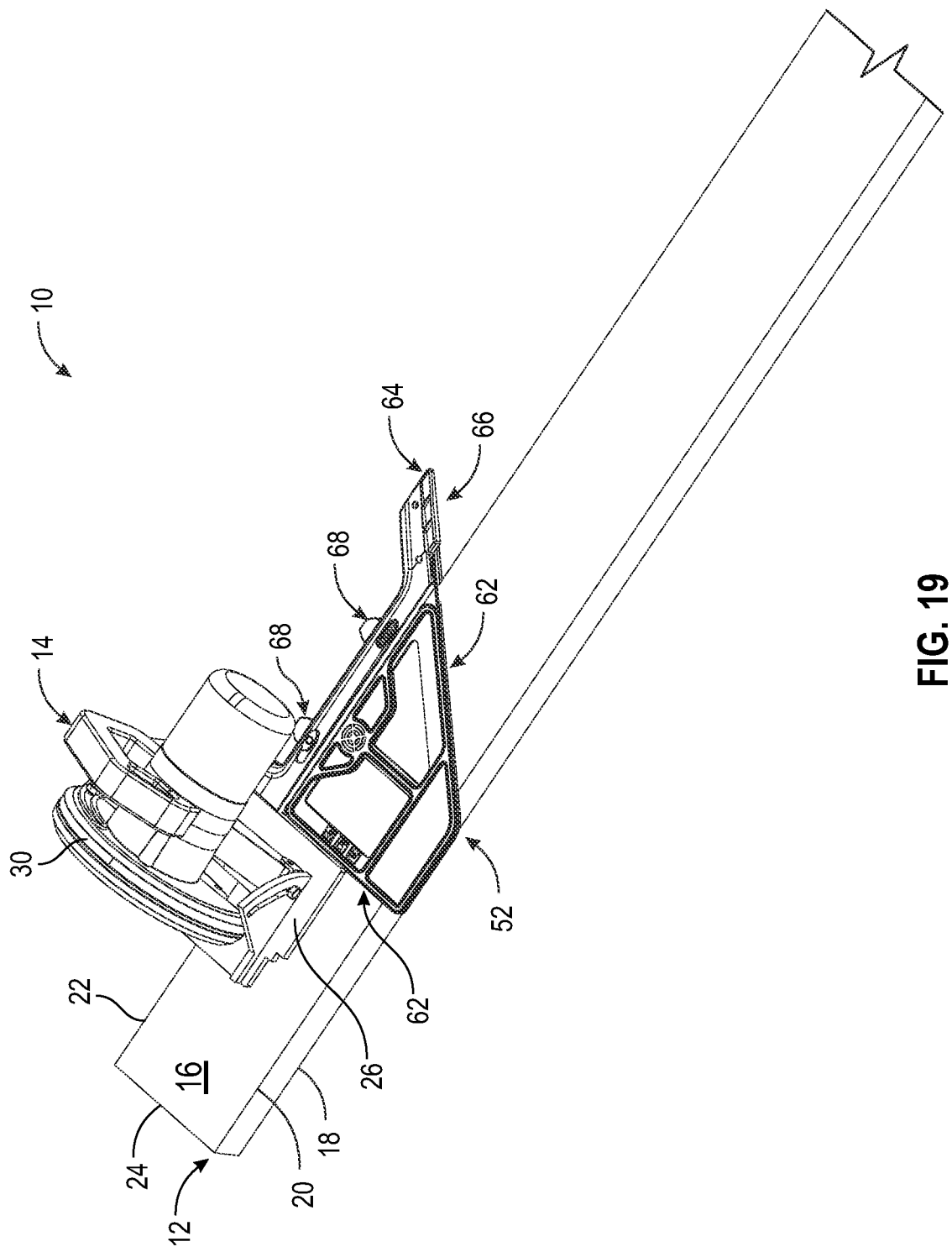
FIG. 19 shows a front left perspective view of a portable cross cut system positioned on a workpiece for cutting with a table saw, in accordance with one or more embodiments; the view showing the portable cross cut system positioned for a strait cut of the workpiece along a measured mark; the view showing a baseplate of the saw guided along a strait edge guide of the system.
Figure 20:
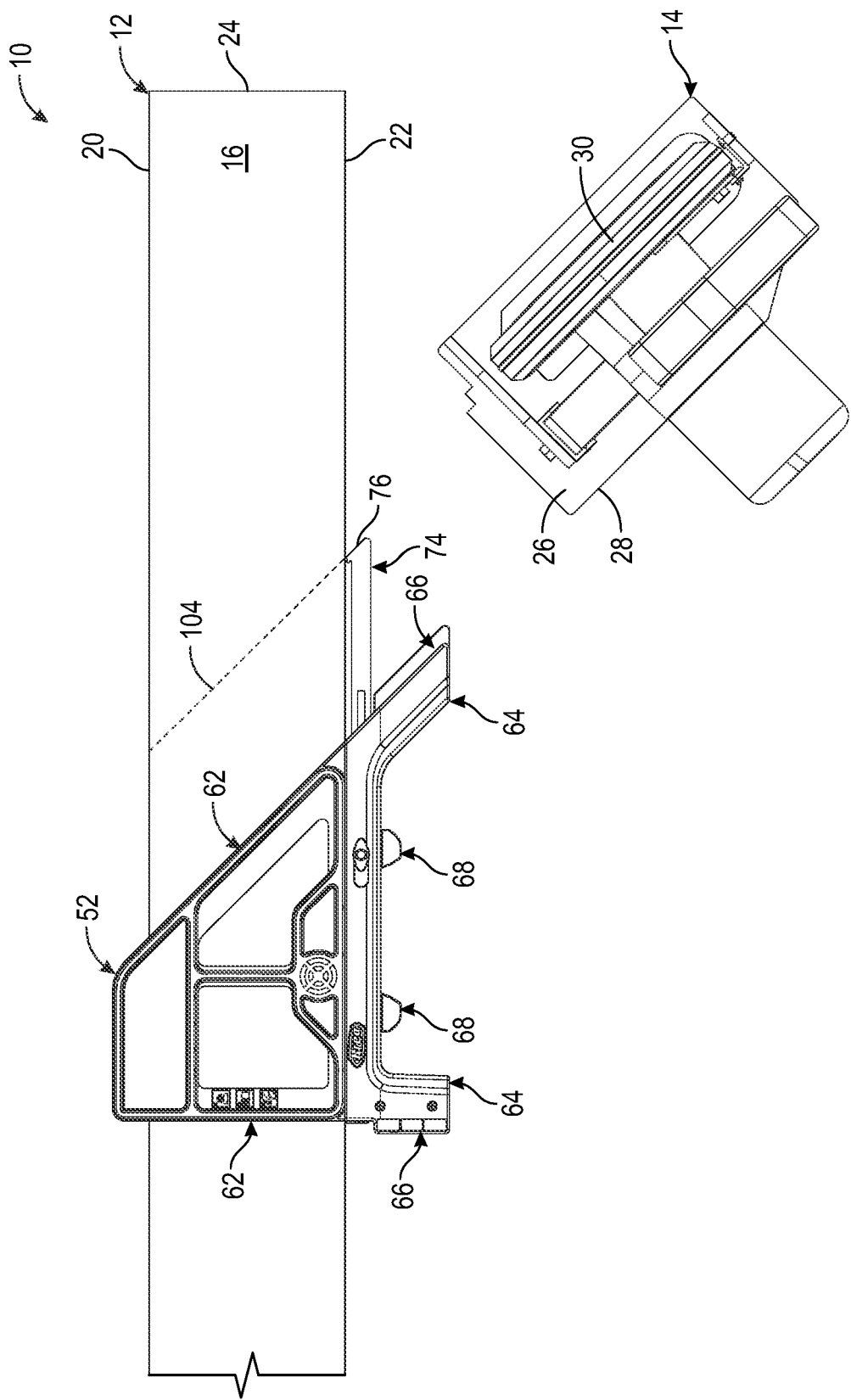
FIG. 20 shows a top view of a portable cross cut system positioned on a workpiece for cutting with a table saw, in accordance with one or more embodiments; the view showing the portable cross cut system in the second orientation with an angled guide edge on the right side of the system and a strait guide edge on the left side of the system; the view showing the portable cross cut system positioned for an angled cut of the workpiece along a measured mark; the view showing an arm of the system extended and aligned with the measuring mark.
Figure 21:
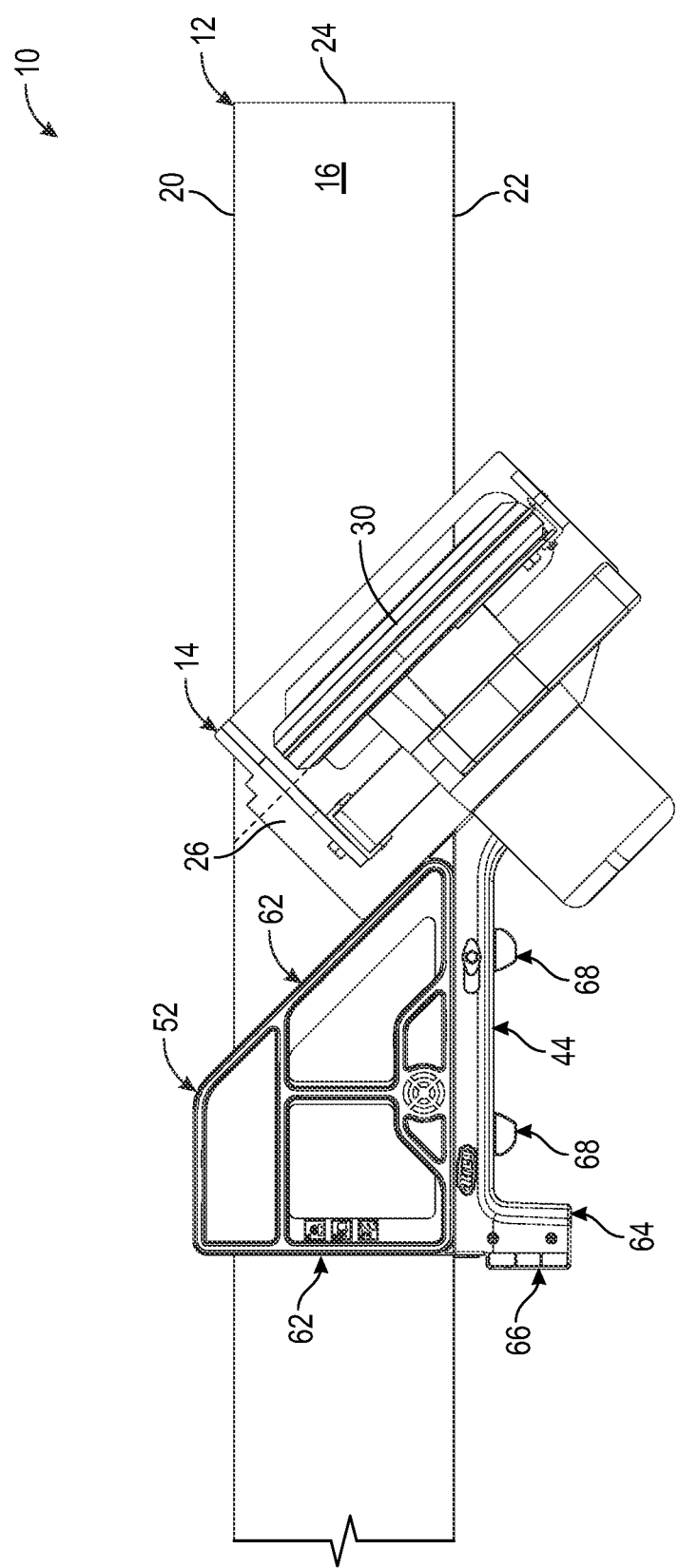
FIG. 21 shows a top view of a portable cross cut system positioned on a workpiece for cutting with a table saw, in accordance with one or more embodiments; the view showing the portable cross cut system in the second orientation with an angled guide edge on the right side of the system and a strait guide edge on the left side of the system; the view showing the portable cross cut system positioned for an angled cut of the workpiece along a measured mark; the view showing the a baseplate of the saw guided along the angled guide edge of the system.
Figure 22:
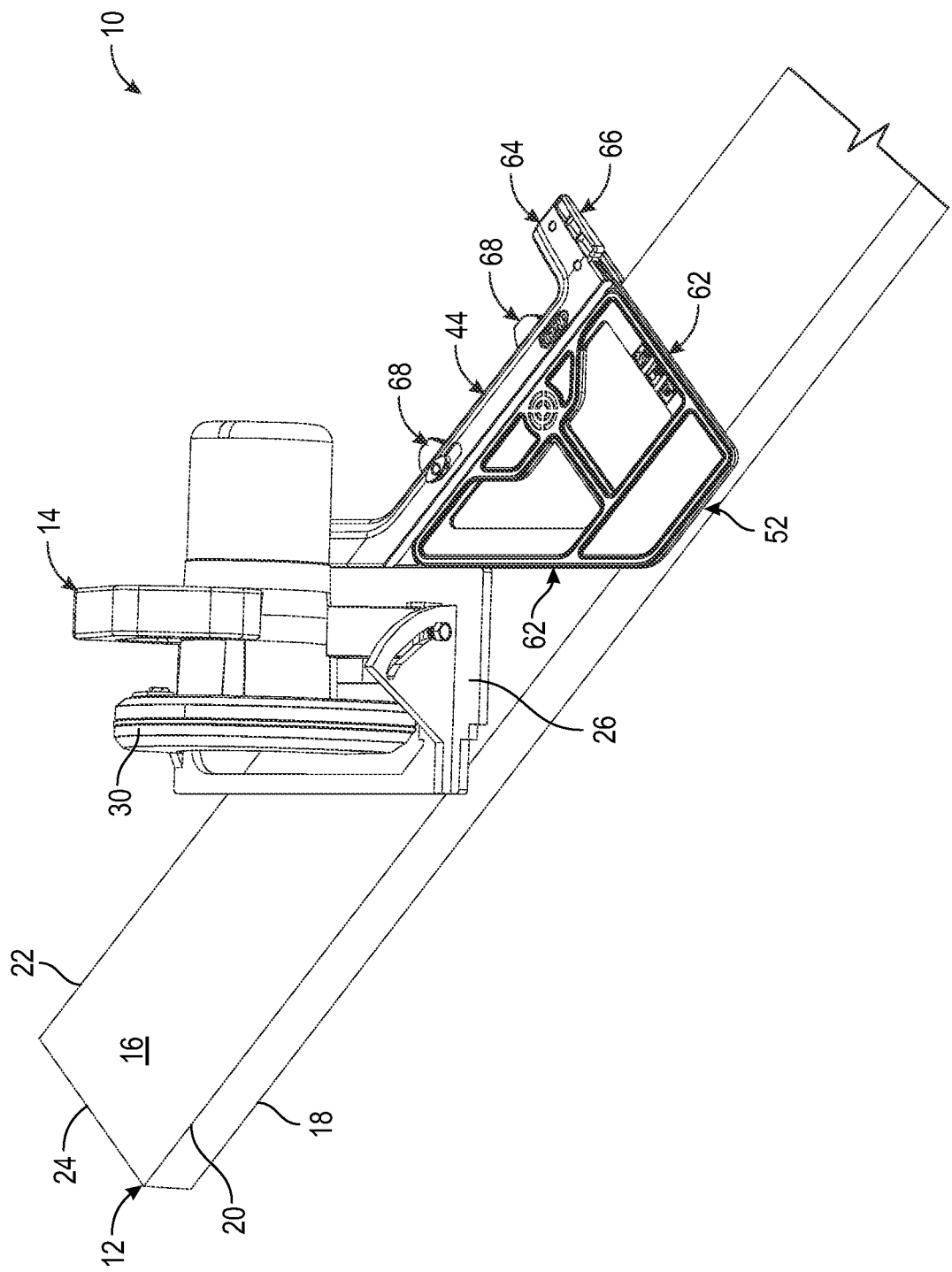
FIG. 22 shows a front left perspective view of a portable cross cut system positioned on a workpiece for cutting with a table saw, in accordance with one or more embodiments; the view showing the portable cross cut system positioned for an angled cut of the workpiece along a measured mark; the view showing the a baseplate of the saw guided along the angled edge guide of the system.

In the arrangement shown, as one example, when portable cross cut system 10 is viewed from the side, as is shown in FIG. 3 and FIG. 4, engagement member 52 is generally centrally positioned on the forward side or reference edge 46 of main body 44. In the arrangement shown, as one example, the width of engagement member 52 between opposing upper surface and lower surface 88 on each side 40/42 is substantially narrower than the width of main body 44 between opposing upper surface and lower surface 82. In this way, the forward edge or reference edge 46 of main body 44 protrudes outward from the rear edge 84 of engagement member 52 in a generally perpendicular planar arrangement to the plane formed by the upper surface and lower surface 88 of engagement member 52. In this way, forward edge or reference edge 46 of main body 44 forms a lip that is configured to engage a rear edge 22 of workpiece 12 while the lower surface of upper surface and lower surface 88 lays in generally flat planar alignment with the upper surface 16 of workpiece 12.

In this way, when viewed from a side 36/38 portable cross cut system 10 is generally symmetric along a center line that extends through the front side 32 to rearward sixe 34 center of engagement member 52, main body 44 and tail sections 64. In this way, regardless of the orientation of portable cross cut system 10, regardless of which side is the upper side 40 and which side is the lower side 42, engagement member 52 forms a generally planar lower surface that engages an upper surface 16 of workpiece 12 and the forward edge or reference edge 46 of main body forms a generally planar surface that engages a rear edge 22 of workpiece 12 thereby precisely aligning portable cross cut system 10 to workpiece 12. This configuration allows portable cross cut system 10 to be flipped over (thereby swapping which side is the upper side 40 and which side is the lower side 42) and used on either side.

In the arrangement shown, as one example, engagement member 52 includes grip member 60 on the upper and lower surfaces 88.

Grip Member 60: In one arrangement, to provide both desired grip as well as desired structural rigidity, while also preventing damage to workpiece 12, upper surface and lower surface 88 of engagement member 52 includes a grip member 60. That is, the portable cross cut system 10, or more specifically main body 44 and engagement member 52 and tail sections 64 are formed of a generally rigid plastic material or composite material or the like that provides the needed structural rigidity to maintain the dimensional accuracy of the device as well as to provide accurate guidance to cutting tool 14 during a cutting operation as well as to endure the harsh environment of use as well as years of use. Due to the material properties of the tough and rigid and strong plastic or composite material it tends to be relatively slick and haves a low coefficient of friction. As such, if this material itself were in direct engagement with workpiece 12, the portable cross cut system 10 would have a tendency to slip along the length of workpiece 12, or said another way there would be a low coefficient of friction between the lower surface of the upper surface and lower surface 88 of engagement member 52 and the forward edge or reference edge 46 of main body 44 and the workpiece 12.

To provide increased grip upon workpiece 12, the upper surface and lower surface 88 of engagement member 52 includes grip member 60 or a layer (grip layer 60) formed of a more flexible and/or more compressible material than the plastic or composite material that forms the other portions of main body 44 and engagement member 52 and tail sections 64 of portable cross cut system 10. Grip member 60 is formed of any material that that has a higher coefficient of friction than the plastic or composite material that forms main body 44 and engagement member 52 and tail sections 64 of portable cross cut system 10, and therefore the grip member 60 provides enhanced grip on workpiece 12. The enhanced grip of the grip member 60 of lower surface of the upper surface and lower surface 88 of engagement member 52 allows the portable cross cut system 10 to better stay in place during a cutting operation thereby allowing for a cleaner, more accurate and safer cutting operation.

That is, the high coefficient of friction of the material of grip member 60 also helps to hold the workpiece 12 and portable cross cut system 10 in place and prevent workpiece 12 during a cutting operation thereby allowing for a cleaner, more accurate and safer use.

In one arrangement, the grip member 60 and of engagement member 52 are formed of a single piece construction, such as molding the two components together such that they are essentially inseparable, unitary, monolithic and formed of a single-piece construction. This monolithic formation may be made through various manufacturing processes such as dual durometer molding or dual material molding, or any other operation where two different materials are molded together to form a single monolithic and unitary member. Alternatively, the grip member 60 and engagement member 52 may be formed independently of one another and are then connected together by any manner, method or means such as by using two sided tape, adhesive, gluing, cementing, screwing, bolting, welding, using fitting features, using snap fitting features, heat-activating, bonding, or the like, or by connecting by any other manner, method or means. In another arrangement, a first component is formed (either the grip member 60 and engagement member 52) through any process such as extrusion, molding, casting, machining, forming or the like and the second component (the other of the grip member 60 and engagement member 52) is added to the formed first component in a secondary manufacturing process such as molding, extrusion, spray deposition or the like processes identified herein or any other manufacturing process.

In one arrangement, grip member 60 covers all of the surface of the upper surface and lower surface 88 of engagement member 52. In another arrangement, grip member 60 covers only a portion of the lower surface of the upper surface and lower surface 88 of engagement member 52. In one arrangement, grip member 60 is a single continuous member. In another arrangement, multiple grip members 60 are attached to or formed as part of the upper surface and lower surface 88 of engagement member 52. In one arrangement, grip member 60 is flush with the upper surface and lower surface 88 of engagement member 52. In another arrangement, grip member 60 protrudes or is proud of the upper surface and lower surface 88 of engagement member 52.

In one arrangement, as is shown, grip member 60 is a layer of flexible and compressible rubber, foam or similar material that covers that extends in a single continuous and connected member around the upper surface and lower surface 88 of engagement member 52 in a thin strip around the peripheral edge 54, over the structural members 90 and clamp pad member 58. In the arrangement shown, as one example, grip member 60 is formed of a generally thin planar layer that has a generally flat outward facing surface, however any other configuration or shape or design is hereby contemplated for use.

Another benefit of using a compressible material for grip member 60 is that upon clamping the compressible nature of grip member 60 accommodates aberrations in the upper surface 16 of workpiece 12 which increases strength of hold and increases the ease of use and robustness of portable cross cut system 10.

Any other arrangement or configuration is hereby contemplated for use as grip member 60.

In one arrangement, grip member 60 is present on forward edge or reference edge 46 of main body 44. This may be in addition to grip member 60 being present on engagement member 52. Alternatively, the presence of grip member 60 on reference edge 46 may replace grip member 60 on engagement member 52. The presence of grip member 60 on reference edge 46 helps to hold the lateral position of portable cross cut system 10 from sliding along the length of workpiece 12 once the user establishes the desired position of portable cross cut system 10 on workpiece 12.

Guide Edge 62:

In the arrangement shown, as one example, portable cross cut system 10 includes a guide edge 62. Guide edge 62 is formed of any suitable size, shape and design and is configured to facilitate alignment of and provides guidance to baseplate 26 of cutting tool 14 so as to precisely guide blade 30 of cutting tool 14 during a cutting operation.

In the arrangement shown, as one example, a guide edge 62 extends along each side 36/38 of portable cross cut system 10 in a generally flat, straight and planar manner. In the arrangement shown, as one example, each guide edge 62 extends the entire length of portable cross cut system 10 from the rear side 34 of portable cross cut system 10 to the front side 32 of portable cross cut system 10. In the arrangement shown, as one example, each guide edge 62 extends in a generally flat, straight and planar manner the entire length of portable cross cut system 10 from the rear side 34 of portable cross cut system 10 to the front side 32. That is, each guide edge 62 extends in a continuous, consistent and uninterrupted manner from the rear side 34 of portable cross cut system 10 to the front side 32 of portable cross cut system 10.

In the arrangement shown, as one example, the plane formed by one guide edge 62 extends in a generally perpendicular planar manner to the plane formed by reference edge 46. In the arrangement shown, as one example, the plane formed by this guide edge 62 extends at a generally 90° angle to the plane formed by reference edge 46. This perpendicularly extending guide edge 62, which is shown as the right side 38 in FIG. 1, is used to form what are known as cross-cuts in workpiece 12.

In the arrangement shown, as one example, the plane formed by one guide edge 62 extends in a generally angled planar manner to the plane formed by reference edge 46. In the arrangement shown, as one example, the plane formed by this guide edge 62 extends at a generally 45° angle to the plane formed by reference edge 46. This angularly extending guide edge 62, which is shown as the left side 36 in FIG. 1, is used to form what are known as miter-cuts, picture-frame-cuts, or angled cuts in workpiece 12.

While a guide edge 62 that extends at a 90° angle to reference edge 46 and a guide edge 62 that extends at a 45° angle is shown for use with portable cross cut system 10 any other angles are hereby contemplated for use including a 30° angle, a 60° angle or any other angle or any combination thereof or any angle between 0° and 90°.

In the arrangement shown, as one example, guide edge 62, on each side 36/38 of portable cross cut system 10 extends in a continuous and uninterrupted manner along the outside edge of main body 44, engagement member 52 and tail section 64. In this way, the single guide edge 62 on each side 36/38 of portable cross cut system 10 serves as the outward edge of three components or parts of portable cross cut system 10 namely main body 44, engagement member 52 and tail section 64.

In this way, during a cutting operation, the edge 28 of baseplate 26 of cutting tool 14 slides along the entire front side 32 to rear side 34 length of portable cross cut system 12 as the edge 28 of baseplate 26 of cutting tool 14 slides along the entire length of guide edge 62. As the edge 28 of baseplate 26 of cutting tool 14 slides along the entire length of guide edge 62, the edge 28 of baseplate 26 of cutting tool 14 slides along the outside edge of tail section 64, main body 44 and engagement member 52 as cutting tool 14 moves from rear side 34 to front side 32 during a cutting operation.

In the arrangement shown, as one example, the rearward section of guide edge 62 is formed by the outward edge of tail section 64.

Tail Section 64:

In the arrangement shown, as one example, portable cross cut system 10 includes a tail section 64. Tail section 64 is formed of any suitable size, shape and design and is configured to extend guide edge 62 rearward a distance from main body 44 so as to provide additional alignment and guidance to edge 28 of baseplate 26 of workpiece 12 so as to provide safer, more-accurate and easier cuts. Tail section 64 is also configured to provide an area for landing pad 66 to attach to portable cross cut system 10.

In the arrangement shown, as one example, a tail section 64 extends rearward from the rear edge 80 of main body 44 at each outward side 36/38 of main body 44. In the arrangement shown, as one example, each tail section 64 connects at its forward end to the rear side of main body 44 and extends rearward in a generally continuous manner before terminating in a rear edge 92. That is, in the arrangement shown, as one example, tail section 64 at each outward side 36/38 of main body 44 is formed of a generally continuous and unitary member with main body 44.

In this way, in the arrangement shown, as one example, the outward surface of tail section 64 is a generally continuous extension of guide edge 62. In this way, in the arrangement shown, as one example, the upper surface and lower surface of tail section 64 is a generally continuous extension of upper surface and lower surface 82 of main body 44. Although, the upper surface and lower surface of tail section 64 taper toward one another or narrow as they extend toward one another as they extend from rear edge 80 of main body 44 to rear edge 92 of tail section 64.

In the arrangement shown, as one example, opposing tail sections 64 terminate at an inward edge 94, which encloses the inward side of tail sections 64. In the arrangement shown, as one example, inward edge 94 of each tail section 64 extends in a generally parallel spaced planar alignment to the opposing guide edge 62, which defines the outward edge of each tail section 64.

In the arrangement shown, as one example, the rearward end of guide edge 62 connects to the outward edge of rear edge 92 of tail section 64. In the arrangement shown, as one example, the rearward end of inward edge 94 connects to the outward edge of rear edge 92 of tail section 64.

In addition to adding additional length to guide edge 62, rearward of workpiece 12, which provides additional guidance to baseplate 26 of cutting tool 14 during a cutting operation, tail section 64 also provides landing pad 66.

Landing pad 66 is formed of any suitable size, shape and design and is configured to receive the lower surface of baseplate 26 at its outward side 28 and serves to align baseplate 26 with the upper surface 16 of workpiece 12 just rearward of the rear edge 22 of workpiece 12 so as to facilitate an easy, smooth and accurate transition of baseplate 26 over workpiece 12. This eases the initiation of a cutting operation, facilitates smoother and more accurate cuts, makes the cutting process substantially easier, and makes the cutting process substantially safer.

In the arrangement shown, as one example, each tail section 64 includes a landing pad 66. In the arrangement shown, as one example, landing pad 66 of each tail section 64 extends outward from guide edge 62 a distance, but not so far that tail section 64 interferes with blade 30 of cutting tool 14. The farther outward that landing pad 66 of tail section 64 extends the greater the amount of alignment provided to baseplate 26. However, this outward extension of landing pad 66 is balanced with the objective of portable cross cut system 10 working with most if not all cutting tools 14 (such as circular saws for example).

In the arrangement shown, as one example, each tail section 64 includes an upwardly facing surface 96. In the arrangement shown, as one example, upwardly facing surface 96 is generally flat and planar in nature and is configured to be used when one of the upper surface and lower surface 88 of engagement member 52 is facing upward, but is configured to not be used when the other of the upper surface and lower surface 88 of engagement member 52 is facing upward.

That is, as is shown in FIG. 1, as one example, landing pad 66 on the right side 38 of portable cross cut system 10 is facing upward and is configured to be used when the guide edge 62 on the right side 38 of portable cross cut system 10 is used, which coincides with making a 90° cross-cut of workpiece 12. As is shown in FIG. 1, as one example, landing pad 66 on the left side 36 of portable cross cut system 10 is facing downward and configured to be used when the guide edge 62 on the left side 36 of portable cross cut system 10 is used, which coincides with making a 45° angled-cut or miter-cut of workpiece 12.

In the arrangement shown, as one example, landing pad 66 includes a forward edge 98, an opposite rearward edge 100 and an outward edge 102.

In the arrangement shown, as one example, forward edge 98 of landing pad 66 extends outward from guide edge 62 in approximate parallel spaced planar alignment to reference edge 46. In the arrangement shown, as one example, forward edge 98 is positioned rearward of reference edge 46 a distance, as well as rearward of arm 74 of blade offset member 68 so as to provide blade offset member 68 room to operate without interference.

In the arrangement shown, as one example, rearward edge 100 of landing pad 66 extends outward from guide edge 62 in approximate parallel spaced planar alignment to reference edge 46. In the arrangement shown, as one example, rearward edge 100 extends in approximate parallel planar alignment with the rear edge 92 of tail section 64. In this way, rearward edge 100 of landing pad 66 is an extension of rear edge 92 of tail section 64.

In the arrangement shown, as one example, outward edge 102 of landing pad 66 extends in approximate parallel spaced planar alignment to guide edge 62. In the arrangement shown, as one example, outward edge 102 of landing pad 66 extends in approximate parallel spaced planar alignment to inward edge 94 of tail section 64.

In the arrangement shown, as one example, the upwardly facing surface 96 of landing pad 66 is positioned in approximate parallel planar alignment with the lower surface of one of the upper surface and lower surface 88 of engagement member 52. As such, when the lower surface of one of the upper surface and lower surface 88 of engagement member 52 is placed on the upper surface 16 of workpiece 12 the upwardly facing surface 96 of landing pad 66 in approximate parallel planar spaced alignment with the upper surface 16 of workpiece 12. In this way, when baseplate 26 of cutting tool 14 is placed on top of or rested upon the upwardly facing surface 96 of landing pad 66, the bottom planar surface of baseplate 26 is in approximate planar alignment with the upper surface 16 of workpiece 12. As such, when baseplate 26 of cutting tool 14 is in this position, cutting tool 14 may be easily pushed forward to smoothly, accurately and easily begin the cutting process.

Figure 2:
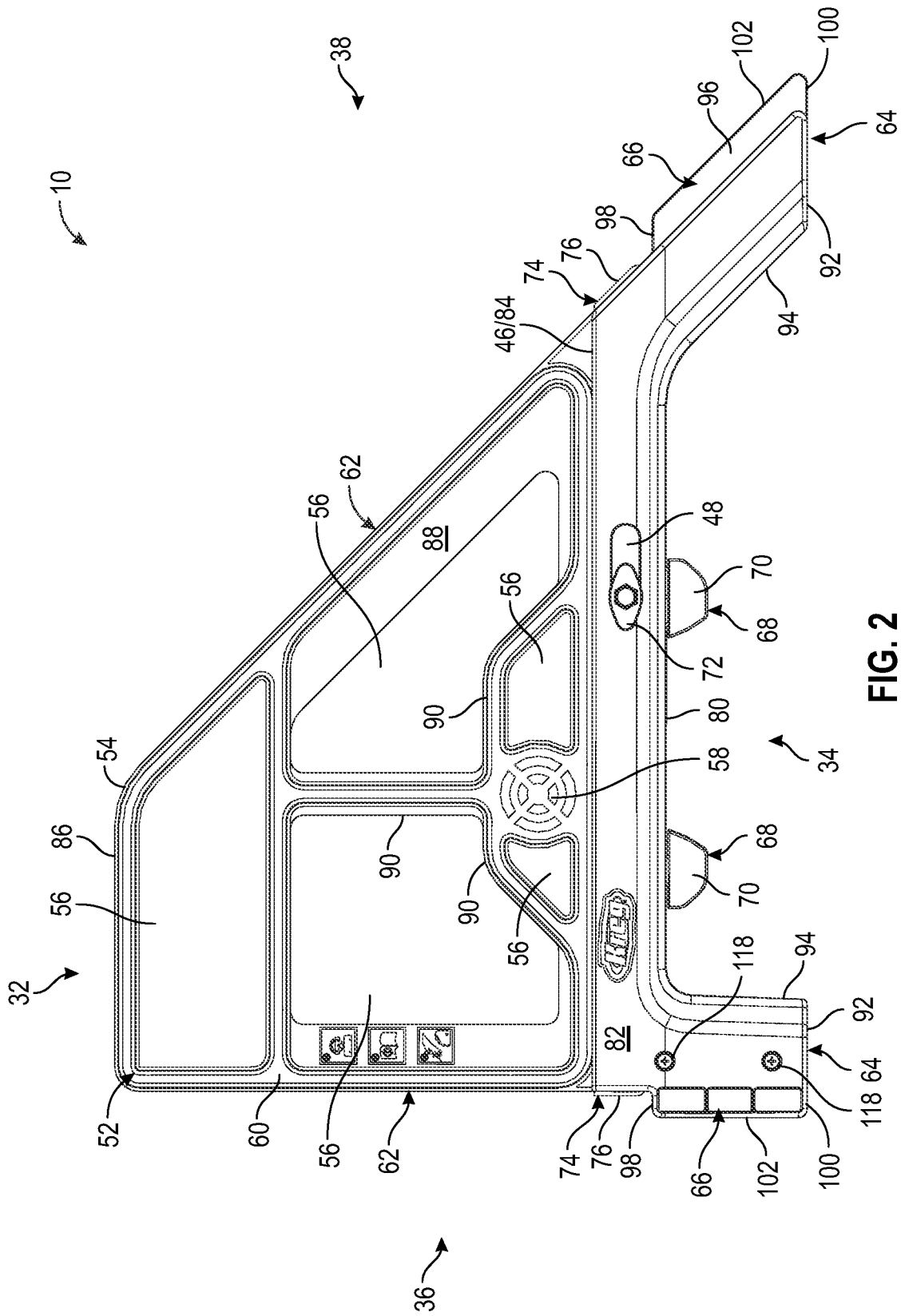
FIG. 2 shows a topside view of a portable cross cut system, in accordance with one or more embodiments; the view showing the portable cross cut system in a second orientation with an angled guide edge on the right side and a strait guide edge on the left side.

In the arrangement shown, as one example, with reference to FIG. 1, the upwardly facing surface 96 of landing pad 66 is associated with the guide edge 62 on the right side 38 of portable cross cut system 10 is associated with a 90° cross-cut. In the arrangement shown, as one example, with reference to FIG. 2, when portable cross cut system 10 is flipped over, the upwardly facing surface 96 of landing pad 66 is associated with the guide edge 62 on the right side 38 of portable cross cut system 10 is associated with a 45° miter-cut, picture-frame-cut, or angled cut.

In the arrangement shown, as one example, landing pad 66 on each side 36/38 of portable cross cut system 10 is positioned just rearward of blade offset member 68.

Blade Offset Member 68:

In the arrangement shown, as one example, portable cross cut system 10 includes blade offset member 68. Blade offset member 68 is formed of any suitable size, shape and design and is configured to indicate the position where the blade 30 of cutting tool 14 will make its cut, or cut line. This allows the user to precisely align the portable cross cut system 10 with a measured mark 104 in an offset-manner due to the width of a baseplate 26 of the cutting tool 14 so that the cutting operation is precisely and accurately and safely and easily performed on the measured mark 104.

In the arrangement shown, as one example, a blade offset member 68 is associated with each guide edge 62 and tail section 64 and landing pad 66. In the arrangement shown, as one example, with reference to FIG. 1, the blade offset member 68 on the right side 38 of portable cross cut system 10 is associated the guide edge 62 and landing pad 66 on the right side 38 of portable cross cut system 10 which is used to make a 90° cross-cut. In the arrangement shown, as one example, with reference to FIG. 2, when portable cross cut system 10 is flipped over, the blade offset member 68 on the right side 38 of portable cross cut system 10 is associated the guide edge 62 and landing pad 66 on the right side 38 of portable cross cut system 10 which is used to make a 45° miter-cut, picture-frame-cut, or angled cut.

In the arrangement shown, as one example, each blade offset member 68 is positioned within main body 44 and extends outward from guide edge 62 just rearward of reference edge 46 and just forward of landing pad 66. In the arrangement shown, as one example, each blade offset member 68 includes an actuator 70, a lock member 72, an arm 74 that extends between an inward end 106 and an outward end 76, and a bias member 78, among other components, features and systems.

Arm 74 is formed of any suitable size, shape and design and is configured to extend and retract, to indicate the position of the cut line of blade 30 of cutting tool 14 so that the portable cross cut system 10 may be accurately and easily positioned to perform a precise cutting operation, and then to moved out of the way to allow for the cutting operation to be performed without any interference from blade offset member 68. In the arrangement shown, as one example, arm 74 is formed of a generally elongated member that extends a length between an inward end 106 to an outward end 76.

In the arrangement shown, as one example, arm 74 has a generally square or rectangular cross-sectional shape, however any other shape is hereby contemplated for use. In the arrangement shown, as one example, while arm 74 has a generally square or rectangular cross-sectional shape arm 74 includes one or more features therein that facilitate attachment and alignment of arm 74 to main body 44. In the arrangement shown, as one example, arm 74 includes a recess positioned within the upper side and lower side of arm 74 that receives a slider 108 connected a knob 110 having a fastener 112 of lock member 72 that extends through first slot 48 in the upper surface of main body 44. In this arrangement, the position of slider 108 may be adjusted along the length of arm 74 so as to facilitate calibration of arm 74 of blade offset member 68 to the position of blade 30 of cutting tool 14 used in association with portable cross cut system 10. In this way, once blade offset member 68 is precisely calibrated to the cutting tool 14 that is to be used with portable cross cut system 10, when blade offset member 68 is actuated, which means arm 74 is fully extended, the outward end 76 of arm 74 indicates the cut line of blade 30 of cutting tool 14 when the edge 28 of baseplate 26 slides along the length of guide edge 62 of portable cross cut system 10.

In the arrangement shown, as one example, slider 108 fits within a recess in the side of arm 74 between outward end 76 and inward end 106 and receives the inward end of fastener 112, which in the arrangement shown is a threaded screw or bolt, however any other fastening device is hereby contemplated for use. In the arrangement shown, as one example, fastener 112 is connected to and operated by knob 110 which facilitates easy tightening and loosening of fastener 112. When fastener 112 is tightened this causes slider 108 to tighten to arm 74, which sets the maximum outward extension of arm 74 when arm 74 is calibrated to blade 30 of cutting tool 14. When fastener 112 is loosened, this allows the relative position of slider 108 to move along the length of arm 74 so as to facilitate calibration of arm 74 to blade 30 of cutting tool 14.

In the arrangement shown, as one example, slider 108 and the main body of arm 74 are positioned within main body 44. In the arrangement shown, as one example, fastener 112 and knob 110 extend through first slot 48 in main body 44 to facilitate engagement with slider 108 and arm 74. In this arrangement, when the user operates blade offset member 68, by pressing actuator 70 outward, arm 74 is moved to the fully extended position and, when calibrated, indicates the cut line of blade 30 of cutting tool 14 when knob 110/fastener 112 engage the outward edge of slot 48 (the side closest to guide edge 62). In this arrangement, when the user releases actuator 70, blade offset member 68 automatically moves from the fully extended positon, knob 110/fastener 112 engage the outward edge of slot 48, to the fully retracted position, when knob 110/fastener 112 engage the inward edge of slot 48 (the side farthest from guide edge 62).

Actuator 70 is formed of any suitable size, shape and design and is configured to facilitate easy operation of blade offset member 68. In the arrangement shown, as one example, actuator 70 is formed of a protrusion that extends outward from rear edge 80 of main body 44 through second slot 50. In this position, when a user grasps main body 44 with their left hand, the user may easily use their thumb to actuate, or press, actuator 70 outward until knob 110 and/or fastener 112 engage the outward edge of first slot 48 at which point blade offset member 68 is in a fully extended position. In this position the outward end 76 of arm 74 indicates the cut line of blade 30 of cutting tool 14.

In the arrangement shown, as one example, blade offset member 68 includes a bias member 78. Bias member 78 is formed of any suitable size, shape and design and is configured to provide a force that automatically retracts arm 74 from a fully extended position to a fully retracted position when the user releases pressure on actuator 70. In the arrangement shown, as one example, bias member 78 is formed of a spring, or more specifically in the arrangement shown, a coiled extension spring, that is positioned within the hollow interior of main body 44 that connects between main body 44 and arm 74 of blade offset member 68. However, any other form of a bias imparting device or system is hereby contemplated for use such as other types of springs, compression members, extension members, or the like or any other form of a bias member.

In the arrangement shown, as one example, the outward end 76 of arm 74 includes a protrusion 114. Protrusion 114 is formed of any suitable size, shape and design and is configured to enlarge the outward end 76 of arm 74 as well as to help indicate the calibrated cut line of cutting tool 14. In the arrangement shown, as one example, protrusion 114 of arm 74 is a point or protrusion that extends toward and points toward the rear edge 22 of workpiece 12 and bridges the distance between the rear edge 22 of workpiece 12 and the forward edge of main body of arm 74. As such, in one arrangement, the forward end of protrusion 114 is configured to be precisely aligned with and/or precisely engage the rear edge 22 of workpiece 12 so as to precisely provide the position of the cut line of blade 30 of cutting tool 14.

Any other configuration is hereby contemplated for use as blade offset member 68.

Powered Arrangement:

In an alternative arrangement, blade offset member 68 may be a powered device. That is, in one arrangement, portable cross cut system 10 includes a power source, such as one or more batteries held within main body 44 that are electrically connected to a switch, such as a button or slide switch or toggle switch or capacitance switch or the like, that is electrically connected to a movement device, such as a motor, solenoid or any other device that converts electrical energy to lateral movement of arm 74. In this arrangement, when the user engages the switch, power is provided to the movement device which causes the arm 74 to move from the fully retracted position to the fully extended positon. When arm 74 is fully extended the user aligns the outward end 76 of arm 74 with a measured mark 104. Once portable cross cut system 10 is properly aligned, with the outward end 76 of arm 74 in alignment with measured mark 104, the user engages the switch again, power is provided to the movement device which causes the arm 74 to move from the fully extended position to the fully retracted positon. This moves the arm 74 out of the way of the blade 30 of cutting tool 14. Once arm 74 is out of the way, the user may power cutting tool 14 and initiate the cutting operation without damaging or cutting blade offset member 68. Providing a powered arrangement as is described herein may make portable cross cut system 10 even easier and more convenient for a user to operate.

Assembly:

In the arrangement shown, as one example, engagement member 52 is formed of a single continuous member. Main body 44 is added to the engagement member 52 by installing opposing halves 116 around the rearward end of engagement member 52. In the arrangement shown, a pair of fasteners 118 are extended through one half 116, through engagement member 52 and into the other half 116 thereby affixing opposing halves 116 together with engagement member 52.

In this arrangement, arm 74, slider 108, actuator 70 knob 110, fastener 112 and bias member 78 are installed wholly or partially within the hollow interior formed by main body 44. When assembled the outward end 76 of arm 74 slightly protrudes out of the guide edge 62, the actuator 70 protrudes through second slot 50, and the knob 110 and fastener 112 protrudes through the first slot 48.

In the arrangement shown, as one example, reference edge 46 is formed as a monolithic piece with the extended narrow engagement member 52. In this way, this ensures precise and durable alignment of the flat planar upper surface and lower surface 88 of engagement member 52 with the flat planar forward surface of reference edge 46. This unitary formation ensures maximum accuracy and precise alignment as there can be no relative movement between parts when these two surfaces are formed of two separate but joined or assembled pieces.

Method of Calibration—Make a Cut:

In the arrangement shown, as one example, one manner of calibrating blade offset member 68 to the blade 30 of a cutting tool 14 is to perform a cut then calibrate the blade offset member 68 to this cut.

To perform a cut, the user selects which side is to be calibrated (either the 90° cross-cut side or the 45° miter-cut or angled-cut side). Once the side is selected, the portable cross cut system 10 is placed on a workpiece 12 with the bottom surface of engagement member 52 in flat and flush engaged alignment with the upper surface 16 of workpiece 12 simultaneously while the reference edge 46 of main body 44 is in flat and flush engaged alignment with rear edge 22 of workpiece 12. In one or more arrangements, an external clamp is placed around main body 44 and clamps clamp pad member 58 into the upper surface 16 of workpiece 12. This external clamp ensures that the portable cross cut system 10 does not move before, during or after the cutting operation so as to ensure maximum accuracy.

Once portable cross cut system 10 is placed on workpiece 12 in this manner, and/or is clamped in place, a cut is performed. To perform a cut using portable cross cut system 10, the user places the lower surface of baseplate 26 on the upwardly facing surface 96 of landing pad 66. Next, the user aligns the inward edge 28 of baseplate 26 with the outwardly facing guide edge 62. In this positon, the cutting tool 14 is properly aligned with the portable cross cut system 10 and is ready to perform a cutting operation.

Next, the user powers the cutting tool 14 while pushing the cutting tool 14 forward. Care is taken to ensure that the outward edge 28 of baseplate 26 slides along the guide edge 62 of the portable cross cut system 10 as the cutting tool 14 moves forward. In this alignment and in this way the user pushes cutting tool 14 until the entirety of workpiece 12 is cut through.

Once workpiece 12 is cut through, without moving the position of portable cross cut system 10 relative to the workpiece 12, arm 74 of blade offset member 68 is moved outward until the outward end 76 of arm 74 is in alignment with the cut end of workpiece 12. Once in this position, lock member 72 is affixed in place to define the outward most position of arm 74. More specifically, in one arrangement, with the outward end 76 of arm 74 in alignment with the cut edge of workpiece 12, lock member 72, which is loosened to move relative to arm 74, is slid until it engages the outward edge of first slot 48. Once in this position, with the outward end 76 of arm 74 in flush alignment with the cut line of workpiece 12, and the lock member 72 in engagement with the outward end of first slot 48, lock member 72 is tightened in place affixing the position of lock member 72 relative to arm 74. In the arrangement shown, as one example, this is accomplished by tightening knob 110 and fastener 112 to slider 108 and arm 74. In doing so, the user sets the outward most position of outward end 76 of arm 74, which is also known as the fully extended positon. Once tightened in place, the user may release actuator 70 which causes the arm 74 to automatically move or retract within main body 44 under the bias force of bias member 78.

In this way, arm 74 is calibrated to blade 30 of cutting tool 14. This process is performed with both blade offset members 68 of portable cross cut system 10.

Method Of Calibration—Alignment Method:

In the arrangement shown, as another example, one manner of calibrating blade offset member 68 to the blade 30 of a cutting tool 14 is to align the cutting tool 14 with the portable cross cut system 10.

To perform this calibration, the user selects which side is to be calibrated (either the 90° cross-cut side or the 45° miter-cut or angled-cut side). Once the side is selected, the user places the lower surface of baseplate 26 on the upwardly facing surface 96 of landing pad 66. Next, the user aligns the inward edge 28 of baseplate 26 with the outwardly facing guide edge 62. In this positon, the cutting tool 14 is properly aligned with the portable cross cut system 10.

Next, the arm 74 of blade offset member 68 is moved outward until the outward end 76 of arm 74 is in alignment with and/or engages the inward facing edge of blade 30 of cutting tool 14. Once in this position, lock member 72 is affixed in place to define the outward most position of arm 74. More specifically, in one arrangement, with the outward end 76 of arm 74 in alignment with inward facing edge of blade 30 of cutting tool 14, lock member 72, which is loosened to move relative to arm 74, is slid until it engages the outward edge of first slot 48. Once in this position, with the outward end 76 of arm 74 in flush alignment with the cut line of workpiece 12, and the lock member 72 in engagement with the outward end of first slot 48, lock member 72 is tightened in place affixing the position of lock member 72 relative to arm 74. In the arrangement shown, as one example, this is accomplished by tightening knob 110 and fastener 112 to slider 108 and arm 74. In doing so, the user sets the outward most position of outward end 76 of arm 74, which is also known as the fully extended positon. Once tightened in place, the user may release actuator 70, which causes the arm 74 to automatically move or retract within main body 44 under the bias force of bias member 78.

In this way, arm 74 is calibrated to blade 30 of cutting tool 14. This process is performed with both blade offset members 68 of portable cross cut system 10.

In Operation:

In the arrangement shown, as one example, once portable cross cut system 10 is calibrated to cutting tool 14 the user uses portable cross cut system 10 to quickly, easily and accurately make cuts in the following manner.

First, the user measures workpiece 12 and places a measured mark 104 on workpiece 12. One of the benefits of the portable cross cut system 10 is that the user only needs to mark the rear edge 22 of workpiece 12 as the portable cross cut system 10 will align cutting tool 14 to the measured mark 104 across the width of the workpiece 12. This eliminates the need for the user to use a straight edge and mark the entire upper surface 16 of workpiece 12 as the user does not have to cut to a line, instead the user only has to cut to a measured mark 104. Eliminating the need to draw a line across the entire upper surface 16 of workpiece 12 saves time and eliminates a step in the cutting process.

The user selects which side is of portable cross cut system 10 is to be used (either the 90° cross-cut side or the 45° miter-cut or angled-cut side). Once the side is selected, the portable cross cut system 10 is placed on a workpiece 12 with the bottom surface of engagement member 52 in flat and flush engaged alignment with the upper surface 16 of workpiece 12 simultaneously while the reference edge 46 of main body 44 in flat and flush engaged alignment with rear edge 22 of workpiece 12.

Next, the user grasps main body 44 with their left hand and actuates blade offset member 68. This is accomplished by pressing actuator 70 outward, against the bias force of bias member 78 using their thumb. As the user presses on actuator 70 actuator 70 slides outward within second slot 50 while the outward end 76 of arm 74 slides outward from the hollow interior of main body 44 through an opening in guide edge 62 while lock member 72 slides outward within first slot 48. This outward sliding movement continues until lock member 72 engages the outward end of first slot 48 which stops the outward movement of blade offset member 68 thereby defining the fully extended position or outward most position of arm 74. In this position, the outward end 76 of arm 74 represents the cut line of blade 30 of cutting tool 14.

Once arm 74 is in the fully extended positon, the user laterally adjusts the position of portable cross cut system 10 until the outward end 76 of arm 74 aligns precisely with the measured mark 104. Or, in one arrangement, protrusion 114 at the outward end 76 of arm 74 of blade offset member 68 is precisely aligned with the measured mark 104. Once this precise alignment between outward end 76 of arm 74 with the measured mark 104 occurs the portable cross cut system 10 is in the proper position to make the cut.

Once portable cross cut system 10 is in the proper position to make the cut, the user releases actuator 70 of blade offset member 68. When the user releases actuator 70 of blade offset member 68 the bias force of bias member 78 retracts arm 74 from the fully extended position to the fully retracted position. This moves arm 74 out of the way of blade 30 of cutting tool 14 so that a cutting operation can be performed without interference with or damage to arm 74. The benefit of this automatic retraction cannot be overstated as the user is allowed to operate portable cross cut system 10 with only one hand, their left hand, while ensuring maximum accuracy.

Once portable cross cut system 10 is placed on workpiece 12 in this manner, the user may clamp portable cross cut system 10 in place using a clamp placed around main body 44 and clamped to clamp pad member 58 and workpiece 12. Alternatively, once portable cross cut system 10 is placed on workpiece 12 in this manner, the user may grasp workpiece 12 using their left hand while simultaneously holding portable cross cut system 10. This is accomplished by the user's hand engaging and reaching around main body 44 of portable cross cut system 10 while the user's fingers extend through openings 56 in engagement member 52. This allows the user to grasp and control both portable cross cut system 10 and workpiece 12 using only a single hand.

Notably, when portable cross cut system 10 in place on workpiece 12, the grip member 60 on the lower surface of engagement member 52 imparts a high level of grip, or a high coefficient of friction on workpiece 12 thereby helping to maintain the relative position portable cross cut system 10 and workpiece 12.

To perform a cut using portable cross cut system 10, the user places the lower surface of baseplate 26 on the upwardly facing surface 96 of landing pad 66. Next, the user aligns the inward edge 28 of baseplate 26 with the outwardly facing guide edge 62. In this positon, the cutting tool 14 is properly aligned with the portable cross cut system 10 and is ready to perform a cutting operation.

Next, the user powers the cutting tool 14 while pushing the cutting tool 14 forward. Care is taken to ensure that the outward edge 28 of baseplate 26 slides precisely along and in engagement with the guide edge 62 of the portable cross cut system 10 as the cutting tool 14 moves forward while the blade 30 rotates through the workpiece 12. In this alignment and in this way, the user pushes cutting tool 14 until the entirety of workpiece 12 is cut through.

This same process is performed for 90° cuts as well as 45° cuts using the same portable cross cut system 10 by simply flipping it over from one side to the other.

In this way, a precise cut is made through workpiece 12 in a fast, easy and safe manner. One of the benefits of the portable cross cut system 10 is that the user does not have to cut to a line. That is, the user only aligns the portable cross cut system 10 to a measured mark 104. Then, the portable cross cut system 10 aligns the cutting tool 14 to the measured mark 104 along the entire length of the cut. As such, the user does not have to watch the blade 30 closely during the cutting operation. Instead, the user can keep their eyes on other things, which makes the cutting operation safer. In addition, the user is safer as they do not need a direct line of sight with the blade 30 during the cutting operation thereby reducing the potential for woodchips generated during cutting to get into the user's eyes which often happens when users closely watch the blade 30 during performance of a cutting operation.

From the above discussion, it will be appreciated that the improved portable cross cut system 10 and related methods of use, presented herein improves upon the state of the art. Specifically, in one or more arrangements, the improved portable cross cut system 10 and related methods of use presented: is safe to use; is efficient to use; is relatively inexpensive; is capable of making straight cuts; is accurate; is efficient to use; provides precise alignment for a cutting tool; can be used with workpieces with a wide range of thicknesses; can be used with workpieces with a wide range of lengths; can be used with workpieces with a wide range of widths; is unique; is easy to learn how to use; is relatively small in size and shape; provides many of the benefits of a miter saw; holds workpieces in a firm and rigid manner; is easy to set up; is easy to take down; is easy to precisely adjust; can be precisely matched to the blade of a cutting tool; is formed of a minimum number of parts; is simple to use; is easier to use than prior art systems; is more-accurate to use than prior art systems; provides new capabilities to existing tools; has a robust design; is high quality; is durable; has a long useful life; provides accurate and clean cuts; saves time; is fun to use; can be used with workpieces of practically any material; is easily portable and can be used on a job site; makes it easier to measure cuts; makes measuring more repeatable than prior art systems; and/or can be used with practically any cutting tool, among countless other advantages and improvements.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed:

1. A portable cross cut system, comprising:
a main body;
the main body having a reference edge;
wherein the reference edge is configured to engage an edge of a workpiece;
an engagement member;
the engagement member connected to the main body;
a first guide edge;
the first guide edge configured to guide an edge of a baseplate of a cutting tool during a cutting operation;
wherein the first guide edge is positioned at an angle relative to the reference edge of the main body;
a first blade offset member;
the first blade offset member connected to the main body;
the first blade offset member having an arm that moves between an extended position and a retracted position;
wherein the arm of the first blade offset member is positioned at least partially within the main body;
wherein the arm of the first blade offset member is moved to the extended position by pressing an actuator of the first blade offset member thereby causing the arm of the first blade offset member to extend a length outward from the first guide edge;
wherein when the arm of the first blade offset member is in an extended position, the arm indicates a cut line of the cutting tool.

2. The system of claim 1, wherein the first guide edge extends at an approximate 90° angle to the reference edge.

3. The system of claim 1, wherein the first guide edge extends at an approximate 45° angle to the reference edge.

4. The system of claim 1, further comprising a second guide edge, wherein the first guide edge extends at an approximate 90° angle to the reference edge and wherein the second guide edge extends at an approximate 45° angle to the reference edge.

5. The system of claim 1, further comprising the first blade offset member having a bias member that automatically retracts the arm of the first blade offset member from an extended position to a retracted position when the actuator is released.

6. The system of claim 1, further comprising a landing pad associated with the first guide edge, the landing pad configured to receive a bottom surface of the baseplate of the cutting tool.

7. The system of claim 1, further comprising a first opening in the engagement member that provides access to grip a workpiece through the engagement member.

8. The system of claim 1, further comprising a clamp pad in the engagement member that is configured to receive a clamp so as to facilitate clamping of the engagement member to a workpiece.

9. The system of claim 1, further comprising the engagement member having a grip member, wherein the grip member is formed of a material that has a higher coefficient of friction than the material that forms the engagement member.

10. The system of claim 1, further comprising:
a second blade offset member;
the second blade offset member connected to the main body;
the second blade offset member having an arm that moves between an extended position and a retracted position;
wherein when the arm of the second blade offset member is in an extended position, the arm indicates a cut line of the cutting tool.

11. The portable cross cut system of claim 1, wherein the length the arm extends outward from the first guide edge is configured to be adjusted to align with an edge of a blade of the cutting tool.

12. The portable cross cut system of claim 1, wherein when the actuator is released the first blade offset member moves to the retracted position.

13. The portable cross cut system of claim 1, wherein the first guide edge is formed of the main body and the engagement member.

14. The portable cross cut system of claim 1, further comprising:
a lock member;
the lock member associated with the first blade offset member;
wherein the lock member is configured to set the length of the first blade offset member when the first blade offset member is in a fully extended position.

15. A portable cross cut system, comprising:
a main body;
the main body having a reference edge;
wherein the reference edge is configured to engage an edge of a workpiece;
an engagement member;
the engagement member connected to the main body;
a first guide edge;
the first guide edge configured to guide an edge of a baseplate of a cutting tool during a cutting operation;
a first blade offset member;
the first blade offset member connected to the main body;
the first blade offset member configured to be moved from a retracted position to an extended position by pressing an actuator;
further comprising a first landing pad associated with the first guide edge, the first landing pad configured to receive a bottom surface of the baseplate of the cutting tool to ease initiation of a cut using the cutting tool.

16. The system of claim 15, further comprising:
a second guide edge;
the second guide edge configured to guide an edge of a baseplate of a cutting tool during a cutting operation;
a second landing pad associated with the second guide edge, the second landing pad configured to receive a bottom surface of the baseplate of the cutting tool to ease initiation of a cut using the cutting tool.

17. The system of claim 15, further comprising:
a second blade offset member;
the second blade offset member connected to the main body;
the second blade offset member configured to move between an extended position and a retracted position;
wherein a length of the second blade offset member is configured to be adjusted to align with an edge of a blade of the cutting tool.

18. The system of claim 15, further comprising a second blade offset member positioned within the main body.

19. The system of claim 15, further comprising a second blade offset member having an arm, wherein the arm of the second blade offset member extends outward from a second guide edge.

20. The system of claim 15, further comprising the first blade offset member having a bias member that automatically retracts the first blade offset member from an extended position to a retracted position when the actuator is released.

21. The system of claim 15, further comprising a first opening in the engagement member that provides access to grip a workpiece through the engagement member.

22. The system of claim 15, further comprising a clamp pad in the engagement member that is configured to receive a clamp so as to facilitate clamping of the engagement member to a workpiece.

23. The system of claim 15, further comprising the engagement member having a grip member, wherein the grip member is formed of a material that has a higher coefficient of friction than the material that forms the engagement member.

24. The system of claim 15, wherein the first guide edge extends at an approximate 90° angle to the reference edge.

25. The system of claim 15, wherein the first guide edge extends at an approximate 45° angle to the reference edge.

26. The portable cross cut system of claim 15, wherein the first guide edge is formed of the main body and the engagement member.

27. The portable cross cut system of claim 15, further comprising:
a lock member;
the lock member associated with the first blade offset member;
wherein the lock member is configured to set the length of the first blade offset member when the first blade offset member is in a fully extended position.

* * * * *